(12) United States Patent
Xie

(10) Patent No.: US 11,144,744 B2
(45) Date of Patent: Oct. 12, 2021

(54) BACKLIGHT MODULE, UNDER-SCREEN FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventor: Hao Xie, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/716,456

(22) Filed: Dec. 16, 2019

(65) Prior Publication Data

US 2020/0117877 A1    Apr. 16, 2020

Related U.S. Application Data

(63) Continuation of application No. PCT/CN2018/102339, filed on Aug. 24, 2018.

(51) Int. Cl.
| | |
|---|---|
| G06K 9/00 | (2006.01) |
| G02B 5/20 | (2006.01) |
| G06K 9/20 | (2006.01) |

(52) U.S. Cl.
CPC ........... *G06K 9/0004* (2013.01); *G02B 5/208* (2013.01); *G06K 9/209* (2013.01); *G06K 9/2027* (2013.01); *G06K 9/2036* (2013.01)

(58) Field of Classification Search
CPC .. G06K 9/0004; G06K 9/2027; G06K 9/2036; G06K 9/209; G06K 9/00046;
(Continued)

(56) References Cited

U.S. PATENT DOCUMENTS

| | | | |
|---|---|---|---|
| 2002/0101549 A1 | 8/2002 | Katsu et al. | |
| 2005/0122308 A1* | 6/2005 | Bell | G06F 3/0425 |
| | | | 345/156 |

(Continued)

FOREIGN PATENT DOCUMENTS

| | | |
|---|---|---|
| CN | 102541362 A | 7/2012 |
| CN | 104463107 A | 3/2015 |

(Continued)

OTHER PUBLICATIONS

Chen, C. et al., "High throughput reflective light guide for planar illuminator", Applied Optics, Feb. 20, 2008, pp. 784-791, vol. 47, No. 6.

(Continued)

*Primary Examiner* — Abhishek Sarma
(74) *Attorney, Agent, or Firm* — Scully Scott Murphy & Presser

(57) ABSTRACT

Provided are a backlight module, an under-screen fingerprint identification method, apparatus and an electronic device. The under-screen fingerprint identification apparatus is applied to an electronic device having a backlight module, and includes: a fingerprint identification module disposed under the backlight module and configured to receive an infrared light signal passing through the backlight module that is emitted by an infrared light source and illuminates a human finger, where the infrared light signal is used to detect fingerprint information of the finger; where a haze of the infrared light signal passes through the backlight module is less than a haze of visible light for displaying an image passes through the backlight module. The under-screen fingerprint identification apparatus of embodiments of the present application could effectively implement under-screen fingerprint identification of a passive light-emitting display screen.

12 Claims, 12 Drawing Sheets

(58) Field of Classification Search
CPC .... G06K 9/2018; G06K 9/0012; G02B 5/208; G09F 9/00
See application file for complete search history.

(56) References Cited

U.S. PATENT DOCUMENTS

| | | | |
|---|---|---|---|
| 2011/0007047 A1 | 1/2011 | Fujioka et al. | |
| 2012/0127128 A1 | 5/2012 | Large et al. | |
| 2013/0335677 A1 | 12/2013 | You | |
| 2014/0183342 A1 | 7/2014 | Shedletsky et al. | |
| 2015/0022648 A1 | 1/2015 | Kim et al. | |
| 2016/0224816 A1* | 8/2016 | Smith | G06K 9/0004 |
| 2017/0108672 A1 | 4/2017 | Chang et al. | |
| 2017/0124376 A1 | 5/2017 | Wyrwas et al. | |
| 2017/0153743 A1 | 6/2017 | Kim et al. | |
| 2017/0259397 A1 | 9/2017 | Yajima et al. | |
| 2017/0316248 A1 | 11/2017 | He et al. | |
| 2017/0318239 A1 | 11/2017 | Miyasaka | |
| 2018/0012069 A1 | 1/2018 | Chung et al. | |
| 2018/0314096 A1 | 11/2018 | Yang et al. | |
| 2019/0171050 A1 | 6/2019 | Chen et al. | |
| 2019/0346939 A1 | 11/2019 | Na et al. | |
| 2020/0301207 A1 | 9/2020 | Yoshikawa et al. | |
| 2020/0409218 A1 | 12/2020 | Tsai et al. | |

FOREIGN PATENT DOCUMENTS

| | | |
|---|---|---|
| CN | 105117697 A | 12/2015 |
| CN | 105683993 A | 6/2016 |
| CN | 105807521 A | 7/2016 |
| CN | 106203408 A | 12/2016 |
| CN | 106233295 A | 12/2016 |
| CN | 106325479 A | 1/2017 |
| CN | 106326855 A | 1/2017 |
| CN | 106372587 A | 2/2017 |
| CN | 106462756 A | 2/2017 |
| CN | 106773229 A | 5/2017 |
| CN | 106845451 A | 6/2017 |
| CN | 106934384 A | 7/2017 |
| CN | 107103304 A | 8/2017 |
| CN | 107133581 A | 9/2017 |
| CN | 107170360 A | 9/2017 |
| CN | 107209304 A | 9/2017 |
| CN | 107251046 A | 10/2017 |
| CN | 107256391 A | 10/2017 |
| CN | 107450839 A | 12/2017 |
| CN | 107545234 A | 1/2018 |
| CN | 107644202 A | 1/2018 |
| CN | 107767835 A | 3/2018 |
| CN | 107885361 A | 4/2018 |
| CN | 207268815 U | 4/2018 |
| CN | 108196740 A | 6/2018 |
| CN | 108229241 A | 6/2018 |
| CN | 207601817 U | 7/2018 |
| CN | 109074492 A | 12/2018 |
| CN | 109863508 A | 6/2019 |
| EP | 3267359 A1 | 1/2018 |
| WO | 2005057399 A2 | 6/2005 |
| WO | 2017124664 A1 | 7/2017 |
| WO | 2018049944 A1 | 3/2018 |

OTHER PUBLICATIONS

Wang, X., "Goodix launches live fingerprint recognition chip to push mobile payment security to a new level", Communications World, Feb. 29, 2016, p. 42, issue 8.

Wenwei, Y. et al., "Design of Optical System for Multimode Recognition Based on Fingerprints and Veins", Laser & Optoelectronics Progress, May 1, 2018, pp. 092201-1 to 092201-7, vol. 55, No. 9.

\* cited by examiner

BACKLIGHT MODULE, UNDER-SCREEN FINGERPRINT IDENTIFICATION APPARATUS AND ELECTRONIC DEVICE

CROSS-REFERENCE TO RELATED APPLICATIONS

This application is a continuation of International Application No. PCT/CN2018/102339, filed on Aug. 24, 2018, the disclosure of which is hereby incorporated by reference in its entirety.

TECHNICAL FIELD

Embodiments of the present application relate to the field of under-screen fingerprint identification, and more particularly, to a backlight module, an under-screen fingerprint identification method, an apparatus and an electronic device.

BACKGROUND

At present, under-screen fingerprint identification is mainly applied to an Organic Light-Emitting Diode (OLED) screen, and the principle is that an under-OLED screen fingerprint identification module receives reflected light formed by reflection by a finger that is emitted from the OLED screen itself to detect a fingerprint by using light transmission characteristics the OLED screen possesses.

However, since a light emitting principle and a specific structure of a liquid crystal display (LCD) screen are different from those of the OLED screen, an under-OLED screen fingerprint identification solution is not applicable to the LCD screen.

Therefore, how to implement under-LCD screen optical fingerprint identification is a technical problem urgent to be solved in the field.

SUMMARY

Provided are a backlight module, an under-screen fingerprint identification method, apparatus and an electronic device, and the backlight module, the under-screen fingerprint identification method, apparatus and the electronic device could effectively implement under-screen fingerprint identification of a passive light-emitting display screen.

In a first aspect, provided is an under-screen fingerprint identification apparatus, where the under-screen fingerprint identification apparatus is applied to an electronic device having a backlight module, and includes:

a fingerprint identification module disposed under the backlight module and configured to receive an infrared light signal passing through the backlight module that is emitted by an infrared light source and illuminates a human finger, where the infrared light signal is used to detect fingerprint information of the finger;

where a haze of the infrared light signal passes through the backlight module is less than a haze of visible light for displaying an image passes through the backlight module.

In some possible implementation manners, light transmittance of the infrared light signal passes through the backlight module is greater than light transmittance of the visible light passes through the backlight module.

In some possible implementation manners, reflectivity of the infrared light signal passes through the backlight module is less than reflectivity of the visible light passes through the backlight module.

In some possible implementation manners, the under-screen fingerprint identification apparatus further includes: a visible light filter disposed between the backlight module and the fingerprint identification module.

In some possible implementation manners, the under-screen fingerprint identification apparatus includes:

at least one infrared light source, where each infrared light source is disposed under a display screen.

In some possible implementation manners, when the under-screen fingerprint identification apparatus includes a plurality of infrared light sources, the plurality of infrared light sources are symmetrically arranged with the fingerprint identification module as a center, or the plurality of infrared light sources are symmetrically arranged based on an axis of symmetry, and the axis of symmetry is a line that passes through the fingerprint identification module and is parallel to the display screen.

In some possible implementation manners, the infrared light source is flatly attached to a lower surface of the display screen, or the infrared light source is obliquely attached to a lower surface of the display screen.

In some possible implementation manners, the at least one infrared light source is integrated in the backlight module.

In some possible implementation manners, the at least one infrared light source and a light source in the backlight module for displaying an image are integrally disposed.

In some possible implementation manners, the under-screen fingerprint identification apparatus further includes:

a control processing unit, a modulation circuit, a drive circuit and a demodulation circuit;

the control processing unit is connected to the infrared light source through the modulation circuit, the control processing unit is connected to the infrared light source through the drive circuit, and the fingerprint identification module is connected to the control processing unit through the demodulation circuit; and the control processing unit is configured to control the modulation circuit to modulate the infrared light signal, the control processing unit is further configured to control the drive circuit to drive the infrared light source to emit the infrared light signal, and the demodulation circuit is configured to demodulate the infrared light signal received by the fingerprint identification module and transmit the demodulated infrared light signal to the control processing unit.

In some possible implementation manners, a capturing area of the fingerprint identification module is located in a display screen, and the capturing area includes a plurality of capturing blocks;

the fingerprint identification module specifically includes: an acquisition unit and a fingerprint identification unit;

the acquisition unit is configured to:

acquire light intensity of the capturing blocks in the capturing area located in the display screen; and acquire fingerprint information of the capturing area when the light intensity satisfies a preset condition; and the fingerprint identification unit is configured to perform fingerprint identification according to the fingerprint information.

In some possible implementation manners, the acquisition unit is specifically configured to: acquire the fingerprint information when a variation of the light intensity is greater than or equal to a preset threshold.

In some possible implementation manners, the acquisition unit is specifically configured to: acquire the light intensity through a photoelectric sensor.

In some possible implementation manners, the under-screen fingerprint identification apparatus further includes: a range adjustment unit configured to:

acquire, before the acquisition unit acquires the light intensity, an infrared light signal reflected by the human finger; and adjust a detection range of the photoelectric sensor when the infrared light signal is not within the detection range of the photoelectric sensor.

In some possible implementation manners, the photoelectric sensor is further configured to detect fingerprint information or heart rate information.

In some possible implementation manners, the acquisition unit is specifically configured to: acquire the fingerprint information when the light intensity satisfies the preset condition and a press force with which the human finger is pressed against the capturing blocks is greater than or equal to a pressure threshold.

In some possible implementation manners, the under-screen fingerprint identification apparatus further includes: a pressure sensor configured to acquire, before the acquisition unit acquires the fingerprint information, the press force with which the human finger is pressed against the capturing blocks.

In some possible implementation manners, the acquisition unit is specifically configured to: acquire the fingerprint information when the light intensity satisfies the preset condition and it is determined that the display screen is not shielded.

In some possible implementation manners, the under-screen fingerprint identification apparatus further includes: an illuminance sensor configured to determine, before the acquisition unit acquires the fingerprint information, whether the display screen is shielded.

In some possible implementation manners, the acquisition unit is specifically configured to: acquire the fingerprint information when the light intensity satisfies the preset condition and an object pressed against the capturing blocks is a living body.

In some possible implementation manners, the under-screen fingerprint identification apparatus further includes: a living body detection unit configured to:

acquire heart rate information before the acquisition unit acquires the fingerprint information; and determine whether the object pressed against the capturing blocks is a living body according to the heart rate information.

In some possible implementation manners, the capturing blocks include a plurality of blocks.

In some possible implementation manners, the under-screen fingerprint identification apparatus further includes:

an execution unit configured to execute a target application corresponding to a first press order according to the first press order in which the human finger is pressed against the plurality of blocks and mapping relationship information, where the mapping relationship information includes a correspondence between at least one press order and at least one application, and the at least one press order includes the first press order.

In some possible implementation manners, the acquisition unit is specifically configured to:

acquire the light intensity when it is determined that a display interface of the display screen is switched to a fingerprint verification interface, where the fingerprint verification interface includes an identification of the capturing area.

In some possible implementation manners, the under-screen fingerprint identification apparatus further includes:

a switching unit configured to switch, after a user presses a power button, the display interface of the display screen to the fingerprint verification interface.

In some possible implementation manners, the under-screen fingerprint identification apparatus further includes:

a switching unit configured to switch, after a user touches the display screen, the display interface of the display screen to the fingerprint verification interface.

In a second aspect, provided is an electronic device, and the electronic device includes:

the under-screen fingerprint identification apparatus according to the first aspect and any one of possible implementation manners of the first aspect, where the under-screen fingerprint identification apparatus includes: a fingerprint identification module; and a backlight module, where the fingerprint identification module is disposed under the backlight module.

In some possible implementation manners, the backlight module includes:

a diffusion layer, where a haze of an infrared light signal passes through the diffusion layer is less than a haze of visible light passes through the diffusion layer.

In some possible implementation manners, light transmittance of an infrared light signal passes through the diffusion layer is greater than light transmittance of visible light passes through the diffusion layer.

In some possible implementation manners, the backlight module includes:

a reflection layer, where light transmittance of an infrared light signal passes through the reflection layer is greater than light transmittance of visible light passes through the reflection layer.

In some possible implementation manners, the backlight module includes:

a steel plate provided with a hole, where the fingerprint identification module is disposed under the hole and configured to receive an infrared light signal passing through the hole that is emitted by an infrared light source and illuminates a human finger.

In some possible implementation manners, the electronic device further includes: a display screen, where the under-screen fingerprint identification apparatus is disposed under the display screen.

In a third aspect, provided is a backlight module for under-screen fingerprint identification, where the backlight module is configured to transmit an infrared light signal that is emitted by an infrared light source and illuminates a human finger to a fingerprint identification module, and the infrared light signal is used to detect fingerprint information of the finger;

where the backlight module has a smaller haze with regard to the infrared light signal than with regard to visible light for image display.

In some possible implementation manners, the backlight module includes:

a diffusion layer, where a haze of the infrared light signal passes through the diffusion layer is less than a haze of the visible light passes through the diffusion layer.

In some possible implementation manners, light transmittance of the infrared light signal passes through the diffusion layer is greater than light transmittance of the visible light passes through the diffusion layer.

In some possible implementation manners, the backlight module includes: a reflection layer, where light transmittance of the infrared light signal passes through the reflection layer is greater than light transmittance of the visible light passes through the reflection layer.

In some possible implementation manners, the backlight module includes: a steel plate provided with a hole, where the fingerprint identification module is disposed under the hole and configured to receive the infrared light signal passing through the hole that is emitted by the infrared light source and illuminates the human finger.

In a fourth aspect, provided is an electronic device, and the electronic device includes:

the backlight module according to the third aspect and any one of possible implementation manners of the third aspect.

In some possible implementation manners, the electronic device further includes:

a fingerprint identification module, an infrared light source and a display screen;

the backlight module and the infrared light source are disposed under the display screen, and the fingerprint identification module is disposed under the backlight module; and the fingerprint identification module is configured to receive an infrared light signal passing through the backlight module that is emitted by the infrared light source and illuminates a human finger, and the infrared light signal is used to detect fingerprint information of the finger.

In a fifth aspect, provided is a method for identifying a fingerprint, and the method includes:

acquiring light intensity of capturing blocks in a capturing area located in a display screen;

acquiring fingerprint information of the capturing area when the light intensity satisfies a preset condition; and performing fingerprint identification according to the fingerprint information.

In some possible implementation manners, the acquiring the fingerprint information of the capturing area when the light intensity satisfies the preset condition includes:

acquiring the fingerprint information when a variation of the light intensity is greater than or equal to a preset threshold.

In some possible implementation manners, the acquiring the light intensity of the capturing blocks in the capturing area located in the display screen includes:

acquiring the light intensity through a photoelectric sensor.

In some possible implementation manners, before the acquiring the light intensity of the capturing blocks in the capturing area located in the display screen, the method further includes:

acquiring an infrared light signal reflected by a human finger; and adjusting a detection range of the photoelectric sensor when the infrared light signal is not within the detection range of the photoelectric sensor.

In some possible implementation manners, the photoelectric sensor is further configured to detect fingerprint information or heart rate information.

In some possible implementation manners, the acquiring the fingerprint information of the capturing area when the light intensity satisfies the preset condition includes:

acquiring the fingerprint information when the light intensity satisfies the preset condition and a press force with which a human finger is pressed against the capturing blocks is greater than or equal to a pressure threshold.

In some possible implementation manners, before the acquiring the fingerprint information, the method further includes:

acquiring the press force with which the human finger is pressed against the capturing blocks through a pressure sensor.

In some possible implementation manners, the acquiring the fingerprint information of the capturing area when the light intensity satisfies the preset condition includes:

acquiring the fingerprint information when the light intensity satisfies the preset condition and it is determined that the display screen is not shielded.

In some possible implementation manners, before the acquiring the fingerprint information, the method further includes:

determining whether the display screen is shielded through an illuminance sensor.

In some possible implementation manners, the acquiring the fingerprint information of the capturing area when the light intensity satisfies the preset condition includes:

acquiring the fingerprint information when the light intensity satisfies the preset condition and an object pressed against the capturing blocks is a living body.

In some possible implementation manners, before the acquiring the fingerprint information, the method further includes:

acquiring heart rate information by a living body detection unit; and determining whether the object pressed against the capturing blocks is a living body according to the heart rate information.

In some possible implementation manners, the capturing blocks include a plurality of blocks.

In some possible implementation manners, the method further includes:

executing a target application corresponding to a first press order according to the first press order in which a human finger is pressed against the plurality of blocks and mapping relationship information, where the mapping relationship information includes a correspondence between at least one press order and at least one application, and the at least one press order includes the first press order.

In some possible implementation manners, the acquiring the light intensity of the capturing blocks in the capturing area located in the display screen includes:

acquiring the light intensity when it is determined that a display interface of the display screen is a fingerprint verification interface, where the fingerprint verification interface includes an identification of the capturing area.

In some possible implementation manners, the method further includes:

switching, after a user presses a power button, the display interface of the display screen to the fingerprint verification interface.

In some possible implementation manners, the method further includes:

switching, after a user touches the display screen, the display interface of the display screen to the fingerprint verification interface.

In a sixth aspect, provided is an under-screen fingerprint identification apparatus, and the under-screen fingerprint identification apparatus includes:

an acquisition unit configured to:

acquire light intensity of capturing blocks in a capturing area located in a display screen; and acquire fingerprint information of the capturing area when the light intensity satisfies a preset condition; and a fingerprint identification unit configured to perform fingerprint identification according to the fingerprint information.

In some possible implementation manners, the acquisition unit is specifically configured to: acquire the fingerprint information when a variation of the light intensity is greater than or equal to a preset threshold.

In some possible implementation manners, the acquisition unit is specifically configured to: acquire the light intensity through a photoelectric sensor.

In some possible implementation manners, the under-screen fingerprint identification apparatus further includes: a range adjustment unit configured to:

acquire, before the acquisition unit acquires the light intensity, an infrared light signal reflected by a human finger; and adjust a detection range of the photoelectric sensor when the infrared light signal is not within the detection range of the photoelectric sensor.

In some possible implementation manners, the photoelectric sensor is further configured to detect fingerprint information or heart rate information.

In some possible implementation manners, the acquisition unit is specifically configured to: acquire the fingerprint information when the light intensity satisfies the preset condition and a press force with which a human finger is pressed against the capturing blocks is greater than or equal to a pressure threshold.

In some possible implementation manners, the under-screen fingerprint identification apparatus further includes: a pressure sensor configured to acquire, before the acquisition unit acquires the fingerprint information, the press force with which the human finger is pressed against the capturing blocks.

In some possible implementation manners, the acquisition unit is specifically configured to: acquire the fingerprint information when the light intensity satisfies the preset condition and it is determined that the display screen is not shielded.

In some possible implementation manners, the under-screen fingerprint identification apparatus further includes: an illuminance sensor configured to determine, before the acquisition unit acquires the fingerprint information, whether the display screen is shielded.

In some possible implementation manners, the acquisition unit is specifically configured to: acquire the fingerprint information when the light intensity satisfies the preset condition and an object pressed against the capturing blocks is a living body.

In some possible implementation manners, the under-screen fingerprint identification apparatus further includes: a living body detection unit configured to:

acquire heart rate information before the acquisition unit acquires the fingerprint information; and determine whether the object pressed against the capturing blocks is a living body according to the heart rate information.

In some possible implementation manners, the capturing blocks include a plurality of blocks.

In some possible implementation manners, the under-screen fingerprint identification apparatus further includes:

an execution unit configured to execute a target application corresponding to a first press order according to the first press order in which a human finger is pressed against the plurality of blocks and mapping relationship information, where the mapping relationship information includes a correspondence between at least one press order and at least one application, and the at least one press order includes the first press order.

In some possible implementation manners, the acquisition unit is specifically configured to:

acquire the light intensity when it is determined that a display interface of the display screen is switched to a fingerprint verification interface, where the fingerprint verification interface includes an identification of the capturing area.

In some possible implementation manners, the under-screen fingerprint identification apparatus further includes:

a switching unit configured to switch, after a user presses a power button, the display interface of the display screen to the fingerprint verification interface.

In some possible implementation manners, the under-screen fingerprint identification apparatus further includes:

a switching unit configured to switch, after a user touches the display screen, the display interface of the display screen to the fingerprint verification interface.

In a seventh aspect, provided is an electronic device, and the electronic device includes:

the under-screen fingerprint identification apparatus according to the sixth aspect and any one of possible implementation manners of the sixth aspect.

In some possible implementation manners, the electronic device further includes: a display screen, where the under-screen fingerprint identification apparatus is disposed under the display screen.

Based on the foregoing technical solutions, embodiments of the present application could implement under-screen fingerprint identification of a passive display screen. Specifically, thus, in the embodiments of the preset application, an optical signal for fingerprint identification is an infrared light signal emitted by an infrared light source, and an optical signal for displaying an image is a visible light signal emitted by a visible light source. An under-screen identification apparatus of the embodiments of the present application could not only avoid interference of visible light to fingerprint identification, but also have no influence on a displayed image since the infrared light signal is invisible light. In addition, since a haze of the infrared light signal passes through the backlight module is less than a haze of the visible light for displaying an image passes through the backlight module, not only could the modulation of the visible light signal be implemented, but also the loss of the infrared light signal in light path transmission could be effectively reduced.

Further, in the embodiments of the present application, by designing optical characteristics of a diffusion film, a reflection film and a steel plate in the backlight module, the energy loss of the infrared light signal used for fingerprint identification when passing through the backlight module could be effectively reduced, thereby improving the efficiency of the under-screen fingerprint identification.

Further, in the embodiments of the present application, the under-screen fingerprint identification apparatus determines whether to trigger a fingerprint identification module to capture fingerprint information of a capturing area according to light intensity of a part of an area in capturing blocks located in a display screen, which could effectively improve response speed of fingerprint identification.

DESCRIPTION OF EMBODIMENTS

Figure 1:
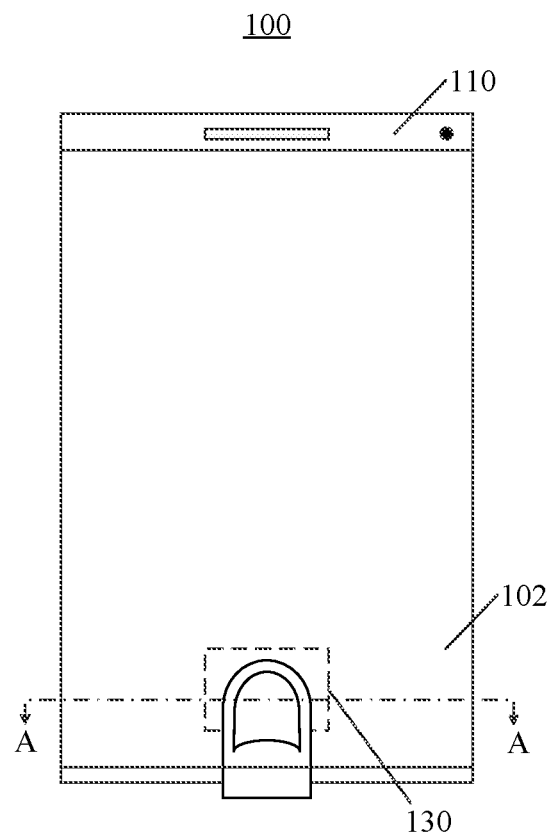
FIG. 1 is a schematic plan view of a mobile terminal to which the present application is applicable.

As a smart terminal enters an era of full screen, a fingerprint capturing area on the front of an electronic device is squeezed by the full screen, and therefore, an under-screen fingerprint identification technology has gained an increasing attention. The under-screen fingerprint identification technology refers to mounting an under-screen fingerprint identification apparatus (for example, a fingerprint identification module) under a display screen, so as to realize a fingerprint identification operation in a display area of the display screen without setting a fingerprint capturing area in an area other than the display area on the front of an electronic device.

The under-screen fingerprint identification technology may include an under-screen optical fingerprint identification technology, an under-screen ultrasonic fingerprint identification technology, or other types of under-screen fingerprint identification technologies.

In an example of the under-screen optical fingerprint identification technology, the under-screen optical fingerprint identification technology uses light returned from a top surface of a display component of a device for fingerprint sensing and other sensing operations. The returned light carries information of an object (e.g., a finger) in contact with the top surface, and a particular optical sensor module located under a display screen is implemented by capturing and detecting the returned light. The particular optical sensor module may be designed to achieve desired optical imaging by properly configuring an optical element for capturing and detecting returned light.

It should be understood that technical solutions of embodiments of the present application can be applied to various electronic devices, and more specifically, can be applied to an electronic device having a display screen. For example, portable or mobile computing devices such as smartphones, laptops, tablets and gaming devices, and other electronic devices such as electronic databases, automobiles and bank automated teller machines (ATM), which are not limited in the embodiments of the present application.

It should also be understood that the technical solutions of the embodiments of the present application can perform other fingerprint identification in addition to fingerprint identification, for example, living body identification and the like, which is not limited in the embodiments of the present application.

The technical solutions in the embodiments of the present application will be described below with reference to accompanying drawings.

It should be noted that, in the embodiments of the present application, the same reference numerals represent the same components, and detailed description of the like components is omitted in different embodiments for the sake of brevity.

It should be understood that dimensions such as the thicknesses, lengths and widths of various components in embodiments of the present application shown in the drawings, as well as dimensions of the overall thickness, length and width of an under-screen fingerprint identification apparatus are merely illustrative, and should not constitute any limitation to the present application.

Figure 2:
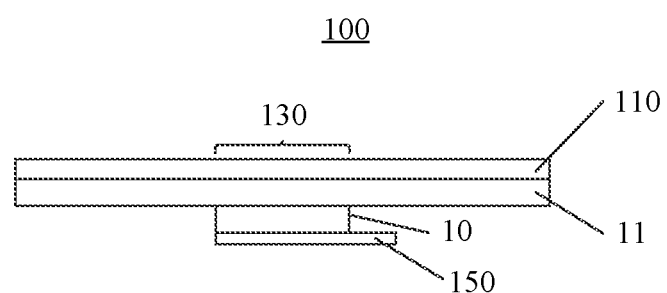
FIG. 2 is a partial schematic cross-sectional view of the mobile terminal shown in FIG. 1 taken along A'-A'.

FIG. 1 and FIG. 2 are schematic views showing a mobile terminal 100 to which an under-screen fingerprint identification apparatus is applicable. FIG. 1 is a schematic front view of a mobile terminal 100 to which an under-screen fingerprint identification apparatus is applicable, and FIG. 2 is a partial schematic cross-sectional structural view of the mobile terminal 100 shown in FIG. 1 taken along A'-A'.

As shown in FIGS. 1 and 2, the mobile terminal 100 may include a display screen 11 and an under-screen fingerprint identification apparatus 10; and the display screen 11 has a display area 102, and the under-screen fingerprint identification apparatus 10 is disposed under the display screen 11.

Optionally, in some embodiments of the present application, the display screen 11 may be a self-emitting display screen that employs a self-emitting display unit as a display pixel. For example, the display screen 11 may be an organic light-emitting diode (OLED) display screen or a micro light-emitting diode (micro-LED) display screen. In other alternative embodiments, the display screen 11 may also be a liquid crystal display (LCD) screen or other passive light-emitting display screens, which is not limited in the embodiments of the present application.

Optionally, in some embodiments of the present application, the display screen 11 may be specifically a touch display screen, which may not only display a screen but also detect a touch or press operation of a user, thereby providing the user with a human-machine interaction interface. For example, in an embodiment, the mobile terminal 100 may include a touch sensor, and the touch sensor may be specifically a touch panel (TP), which may be disposed on a surface of the display screen 11, or may be partially integrated or entirely integrated into an interior of the display screen 11 to form a touch display screen.

Optionally, in some embodiments of the present application, the under-screen fingerprint identification apparatus 10 may be an optical under-screen fingerprint identification apparatus, which may include an optical fingerprint sensor with an optical sensing array, such as an optical fingerprint sensor; and the optical sensing array includes a plurality of optical sensing units, and an area where the optical sensing array is located is a fingerprint capturing area of the under-screen fingerprint identification apparatus 10, and the optical sensing units are used for capturing fingerprint characteristic information (such as fingerprint image information) of a user.

Optionally, in some embodiments of the present application, the optical sensing array of the under-screen fingerprint identification apparatus 10 may be specifically a photo detector array (or referred to as a photodetector array) including a plurality of photo detectors or photodetectors distributed in an array, and the photo detectors or photodetectors may server as the optical sensing units as described above.

Optionally, in some embodiments of the present application, the under-screen fingerprint identification apparatus 10 may be disposed at least in a partial area under the display screen 11 such that the fingerprint capturing area (or sensing area) of the under-screen fingerprint identification apparatus 10 is at least partially located in the display area 102 of the display screen 11.

As shown in FIG. 1, the fingerprint capturing area 130 is located in the display area 102 of the display screen 11. Therefore, when a user needs to unlock the electronic device or perform other fingerprint verification, a fingerprint input operation can be implemented merely by pressing a finger on the fingerprint capturing area 130 in the display screen 11.

Specifically, when a finger touches, is pressed against or approaches (collectively referred to as pressing for convenience of description) the fingerprint capturing area 130, light emitted by the display unit of the fingerprint capturing area 130 is reflected by the finger to form reflected light. The reflected light may carry fingerprint characteristic information of the finger of the user. For example, after the light is reflected by a fingerprint of a surface of the finger of the user, since the reflected light of a ridge of the fingerprint of the finger is different from that of a valley, the reflected light carries fingerprint information of the user. The reflected light is returned to the display screen 11, received by the photo detector array of the under-screen fingerprint identification apparatus 10 under the display screen 11, and converted into a corresponding electrical signal, i.e., a fingerprint detection signal. The mobile terminal 100 can acquire fingerprint information of the user based on the fingerprint detection signal, and can further perform fingerprint matching verification, thereby completing identity verification of the current user so as to confirm whether the user has permission to perform a corresponding operation on the mobile terminal 100.

Since fingerprint capturing can be implemented inside the display area 102 of the display screen 11, a front surface of the mobile terminal 100 in the above structure does not need to reserve space to set a fingerprint button (such as a Home button), so that a full screen solution can be adopted. That is, the display area 102 of the display screen 11 can be substantially extended to the entire front surface of the mobile terminal 100.

It should be understood that the fingerprint capturing area 130 shown in FIG. 1 is merely an example, and the embodiment of the present application is not limited thereto. For example, in other alternative embodiments, the under-screen fingerprint identification apparatus 10 may also be disposed in an entire area under the display screen 11, so as to extend the fingerprint capturing area 130 to the entire display area 102 of the entire display screen 11, thereby implementing full screen fingerprint identification.

It should also be understood that in a specific implementation, the mobile terminal 100 may further include a protective cover 110, the protective cover 110 may be specifically a transparent cover such as a glass cover or a sapphire cover which is located on the display screen 11 and covers a front surface of the mobile terminal 100, and the surface of the protective cover 110 may also be provided with a protective layer. Therefore, in an embodiment of the present application, the so-called finger pressing the display screen 11 may actually refer to the finger pressing the cover 110 on the display screen 11 or covering a surface of the protective layer of the cover 110.

Further, a circuit board 150 may further be provided under the fingerprint identification apparatus 10, for example, a flexible circuit board (Flexible Printed Circuit, FPC). The fingerprint identification apparatus 10 may be soldered to the circuit board 150 through a pad, and achieve electrical interconnection and signal transmission with other peripheral circuits or other elements of the mobile terminal 100 through the circuit board 150. For example, the fingerprint identification apparatus 10 may receive a control signal of a processing unit of the terminal device 100 through the circuit board 150, and may also output a fingerprint inspection signal to the processing unit, a control unit and the like of the terminal device 100 through the circuit board 150.

It should be noted that in the under-screen fingerprint identification process, the display screen 11 adopting the OLED display screen is taken as an example, the display screen 11 has OLED display units distributed in an array, and the under-screen fingerprint identification apparatus 10 can utilize an OLED display unit (i.e., an OLED light source) of the OLED display 11 located in the fingerprint capturing area 130 as an excitation light source for fingerprint detection and identification.

When the display screen 11 adopts a non-self-emitting display screen, such as a liquid crystal display screen or another passive light-emitting display screen, a backlight module is required as a light source of the display screen 11. However, since an optical signal reflected by a human finger is very weak after image display of visible light emitted by the backlight module due to optical characteristics of the backlight module, the optical signal received by the fingerprint identification apparatus 10 could not realize fingerprint identification.

In addition, due to the optical characteristics of the backlight module, in a process of transmitting the optical signal reflected by the human finger to the fingerprint identification apparatus 10, the energy loss is very great, and thus the fingerprint identification could not be realized. That is, an under-OLED screen fingerprint identification scheme is not applicable to an LCD screen.

An embodiment of the present application provides an under-screen fingerprint identification apparatus, which could achieve under-LED screen optical fingerprint identification.

Figure 3:
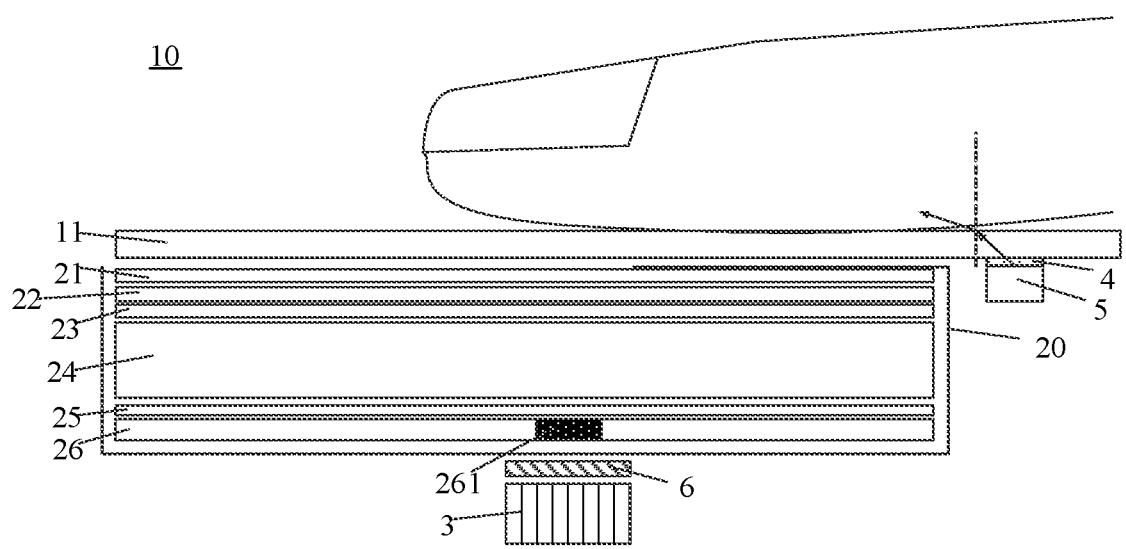
FIG. 3 is a schematic structural view of an under-screen fingerprint identification apparatus according to an embodiment of the present application.

FIG. 3 is a schematic structural view of an under-screen fingerprint identification apparatus according to an embodiment of the present application.

As shown in FIG. 3, the under-screen fingerprint identification apparatus 10 may be applied to an electronic device having a backlight module 20 and a display screen 11, and the under-screen fingerprint identification apparatus 10 may include:

a fingerprint identification module 3, where the backlight module 20 is disposed under the display screen 11; the fingerprint identification module 3 is disposed under the backlight module 20; and the fingerprint identification module 3 is configured to receive an infrared light signal passing through the backlight module 20 that is emitted by an infrared light source 5 and illuminates a human finger, and the infrared light signal is used to detect fingerprint information of the finger; where a haze of the infrared light signal passes through the backlight module 20 is less than a haze of visible light for displaying an image passes through the backlight module 20.

It should be understood that, in the embodiment of the present application, the infrared light signal for fingerprint identification received by the fingerprint identification module 3 may be an optical signal that the human finger performs optical processing on an infrared light signal emitted by the infrared light source. For example, the optical signal received by the fingerprint identification module 3 may be either an infrared light signal that is reflected by the human finger and passes through the backlight module 20, or an infrared light signal that is diffused by the human finger and passes through the backlight module 20. This is not limited in the embodiment of the present application.

It should be noted that, in the embodiment of the present application, the infrared light signal emitted by the infrared light source 5 may be used for fingerprint identification, and the infrared light signal is invisible light.

An optical signal used for image display by the display screen 11 is a visible light source, and specifically, the visible light source may be any light source located behind a liquid crystal display (LCD). For example, the visible light source may be an electroluminescent (EL) backlight source, a minitype cold cathode fluorescent lamp (CCFL) or an LED backlight source.

In summary, according to the under-screen fingerprint identification apparatus 10 of the embodiment of the present application, the optical signal for fingerprint identification is the infrared light signal emitted by the infrared light source 5, and the optical signal for displaying an image is a visible light signal emitted by the visible light source. Therefore, the under-screen identification apparatus 10 of the embodiment of the present application could not only avoid interference of the visible light to fingerprint identification, but also have no influence on a displayed image since the infrared light signal is invisible light.

In addition, since a haze of the infrared light signal passes through the backlight module 20 is less than a haze of visible light for displaying an image passes through the backlight module 20, not only the modulation of a visible light signal could be implemented, but also the loss of the infrared light signal in light path transmission could be effectively reduced.

Optically, in some embodiments of the present application, light transmittance of the infrared light signal passes through the backlight module is greater than light transmittance of the visible light passes through the backlight module.

Optically, in some embodiments of the present application, reflectivity of the infrared light signal passes through the backlight module is less than reflectivity of the visible light passes through the backlight module.

Optically, in some embodiments of the present application, the infrared light source 5 may be fixed under the display screen 11, and the fingerprint identification module 3 may also be fixed under the display screen 11.

For example, as shown in FIG. 3, the infrared light source 5 may be pasted under the display screen 11 by an optical adhesive 4. Similarly, the fingerprint identification module 3 may also be mechanically fixed under the display screen 11. For example, the fingerprint identification module 3 may be fixed under the display screen 11 by means of threaded connection.

Optically, in some embodiments of the present application, the optical adhesive 4 may be any one of optical liquid glue and an optical solid adhesive.

Optically, in some embodiments of the present application, the optical adhesive 4 and the display screen 11 have the same or similar optical reflective indexes, and thus a utilization ratio of the infrared light signal emitted by the infrared light source 5 could be increased as much as possible.

Optically, in some embodiments of the present application, the at least one infrared light source 5 is integrated in the backlight module 20.

Optically, in some embodiments of the present application, the at least one infrared light source 5 and a light source in the backlight module 20 for displaying an image are integrally disposed. For example, the at least one infrared light source 5 and a light source in the backlight module 20 for displaying an image are integrally disposed in parallel.

In other alternative embodiments, the at least one infrared light source 5 and a light source in the backlight module 20 for displaying an image may are integrally disposed in a non-parallel manner. This is not limited in the embodiment of the present application.

Optionally, in some embodiments of the present application, as shown in FIG. 3, the backlight module 20 may include a composite film 21, a brightness enhancement film 22, a diffusion film 23, a light guide plate 24, and a reflection film 25 and a steel plate 26.

Specifically, the visible light emitted by the visible light source is transmitted to the diffusion film 23 after passing through the light guide plate 24, light diffused by the diffusion film 23 is transmitted to the brightness enhancement film 22, the brightness enhancement film 22 is used to gain the received optical signal, and transmit the gained optical signal to the composite film 21, and the composite film 21 receives the optical signal for further gaining the received optical signal and transmits the gained optical signal to the display screen 11 for image display.

It should be understood that the backlight module 20 shown in FIG. 3 is merely an example, and the embodiment of the present application is not limited thereto. For example, in other alternative embodiments, the backlight module 20 may not include the steel sheet 26 and/or the reflection film 25.

In the embodiment of the present application, the light guide plate 24 may use a high-tech material with extremely high reflectivity and no light absorption, and light guide points are printed on the bottom of an optical-level acrylic plate by technologies such as laser engraving technology or ultra-violet ray (UV) screen printing technology. The optical-level acrylic plate is used to absorb light emitted from a lamp to stay on a surface of the optical-level acrylic plate, when the light illuminates the respective light guide points, reflected light may be diffused at various angles, then break a reflection condition, and be out of the front surface of the light guide plate.

The function of the light guide plate 24 is to guide a scattering direction of light to increase brightness of a panel and ensure uniformity of the brightness of the panel. Specifically, the visible light source may be located at a side of the light guide plate 24, and light emitted by the visible light source is introduced into an interior of the light guide plate 24 by reflection. When the light is incident on a diffusion point, reflected light may be diffused at various angles, and then be out of the front surface of the light guide plate 24.

Optionally, in some embodiments of the present application, diffusion points with various dense and different size may be used to cause the light guide plate 24 to uniformly emit light.

Figure 4:
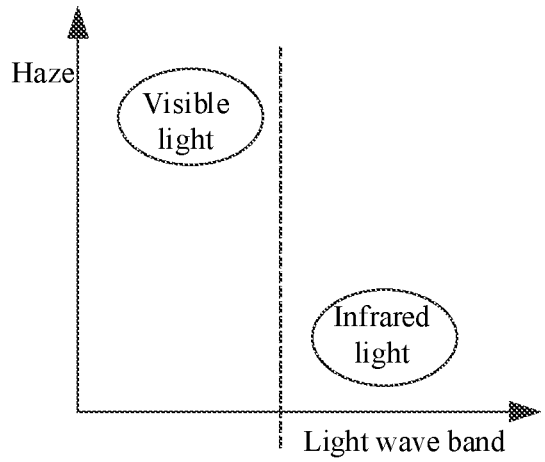
FIG. 4 is a schematic diagram of an optical characteristic of a haze of a diffusion plate according to an embodiment of the present application.

Optically, in some embodiments of the present application, as shown in FIG. 4, a haze of the infrared light signal passes through the diffusion layer 23 is less than a haze of the visible light for displaying an image passes through the diffusion layer 23.

Figure 5:
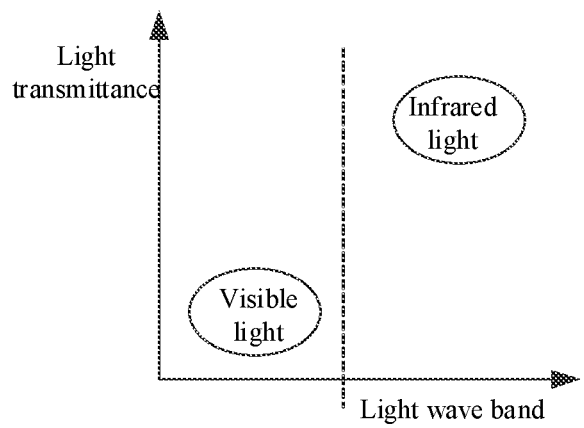
FIG. 5 is a schematic diagram of an optical characteristic of light transmittance of a diffusion plate according to an embodiment of the present application.

Optically, in some embodiments of the present application, as shown in FIG. 5, light transmittance of the infrared light signal passes through the diffusion layer 23 is greater than light transmittance of the visible light passes through the diffusion layer 23.

In the embodiment of the present application, the diffusion plate 23 can not only improve brightness of the front surface of the display screen 11 such that distribution of visible light is more uniform, but also ensure that a user would not see reflection points from the front side. Moreover, since the haze of the infrared light signal passes through the diffusion layer 23 is less than the haze of the visible light for displaying an image passes through the diffusion layer 23, and the light transmittance of the infrared light signal passes through the diffusion layer 23 is greater than the light transmittance of the visible light passes through the diffusion layer 23, the loss of the infrared light signal in optical transmission could be effectively reduced.

Further, since directivity of the optical signal out of the diffusion plate 23 is very poor, in the embodiment of the present application, the direction of the visible light signal could be effectively corrected by the brightness enhancement film 22 to achieve an effect of converging light and improve the brightness of the front surface of the display screen 11.

Optionally, in some embodiments of the present application, the brightness enhancement film 22 may be placed between the diffusion layer 23 and the display screen 11.

Optionally, in some embodiments of the present application, the brightness enhancement film 22 may be implemented by a prismatic film.

The prism film may converge the light that is out of the diffusion sheet 23 and diffused uniformly at various angles onto an axial angle by improving angular distribution of the visible light signal for displaying an image, that is, a front view angle, that is, axial brightness is increased without increasing the total outgoing light flux.

In other words, the prism film may select incident light to pass light that meets a convergence light angle, and unqualified light is reflected back to the diffusion sheet 23, diffused in the diffusion sheet 23 and then returned to the prism film until it meets an emergence condition.

Optionally, in some embodiments of the present application, the brightness enhancement film 22 may be implemented by a reflective polarizer.

The reflective polarizer is different from the prism, the reflective polarizer may perform selective cyclic brightening according to different polarization directions of visible light signal, the reflective polarizer could accurately reflect 100% of polarized light parallel to the optical axis direction thereof, and polarized light in another orthogonal direction may normally penetrate the reflective polarizer.

The function of the reflection plate 25 in the embodiment of the present application in image display is to reflect light leaking from the bottom surface of the light guide plate 24 back into the light guide plate to improve efficiency of use of light.

Figure 6:
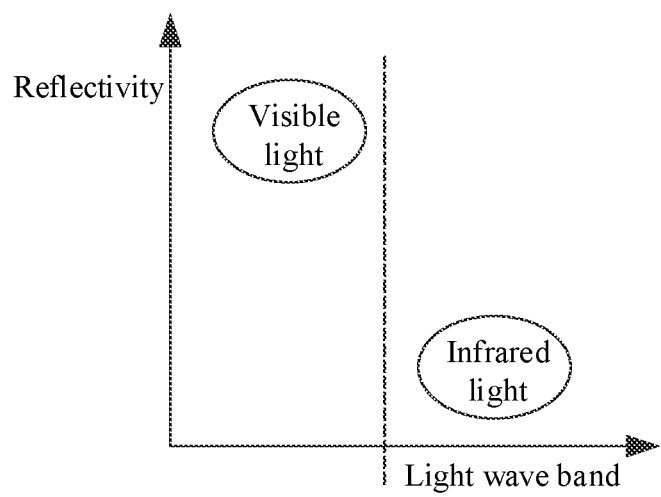
FIG. 6 is a schematic diagram of an optical characteristic of a reflection plate according to an embodiment of the present application.

Optically, in some embodiments of the present application, as shown in FIG. 6, light transmittance of the infrared light signal passes through the reflection layer 25 is greater than light transmittance of the visible light passes through the reflection layer 25.

In the embodiment of the present application, since the light transmittance of the infrared light signal passes through the reflection layer 25 is greater than the light transmittance of the visible light passes through the reflection layer 25, the reflection layer 25 could not only improve efficiency of use of light, but also reduce the loss of the infrared light signal in a transmission path caused by the reflection layer 25 and improve fingerprint identification quality.

Optionally, in some embodiments of the present application, as shown in FIG. 3, the steel plate 26 is provided with a hole 261, and the fingerprint identification module 3 is disposed under the hole 261 and configured to receive an infrared light signal passing through the hole 261 that is emitted by the infrared light source 5 and illuminates the human finger.

It can be found that, in the embodiment of the present application, by providing the opening 261 on the steel plate 26, the visible light signal may be prevented from being transmitted in a direction opposite to the display screen 11 as much as possible, the damage of the backlight module 20 due to an external impact is avoided, and the energy loss of the infrared light signal for fingerprint identification as it passes through the steel plate 26 could be effectively reduced.

Further, as shown in FIG. 3, the under-screen fingerprint identification apparatus 10 further includes a visible light filter 6, and the visible light filter 6 may be disposed between the backlight module 20 and the fingerprint identification module 3. Thereby, visible light transmitted to the visible light filter 6 may be filtered, and the identification quality of the fingerprint identification module 3 could be further improved.

In the embodiment of the present application, the visible light filter 6 may be specifically configured to filter out visible light wavelengths, for example, visible light for image display. The filter 109 may specifically include one or more optical filters, the one or more optical filters may be configured as, for example, bandpass filters to filter out light emitted by a visible light source while not filtering out an infrared light signal. The one or more optical filters can be implemented as, for example, optical filter coatings formed on one or more continuous interfaces or one or more discrete interfaces.

It should be understood that the visible light filter 6 can be fabricated on a surface of any optical component or along an optical path to the fingerprint identification module 3 from reflected light formed by reflection of a finger. FIG. 3 is only an example in which the visible light filter 6 is disposed between the steel plate 26 and the fingerprint identification module 3, and the present application is not limited thereto. For example, the visible light filter 6 may be attached to a bottom surface of the display screen 11, an upper surface of the steel plate 26, an interior of the fingerprint identification module 3, or the like.

Optionally, in some embodiments of the present application, the under-screen fingerprint identification apparatus 10 includes:

at least one infrared light source 5, where each infrared light source 5 is disposed under the display screen.

Optionally, in some embodiments of the present application, when the under-screen fingerprint identification apparatus 10 includes a plurality of infrared light sources 5, the plurality of infrared light sources 5 are symmetrically arranged with the fingerprint identification module 3 as a center, or the plurality of infrared light sources are symmetrically arranged based on an axis of symmetry, and the axis of symmetry is a line that passes through the fingerprint identification module 3 and is parallel to the display screen 11.

Figure 7:
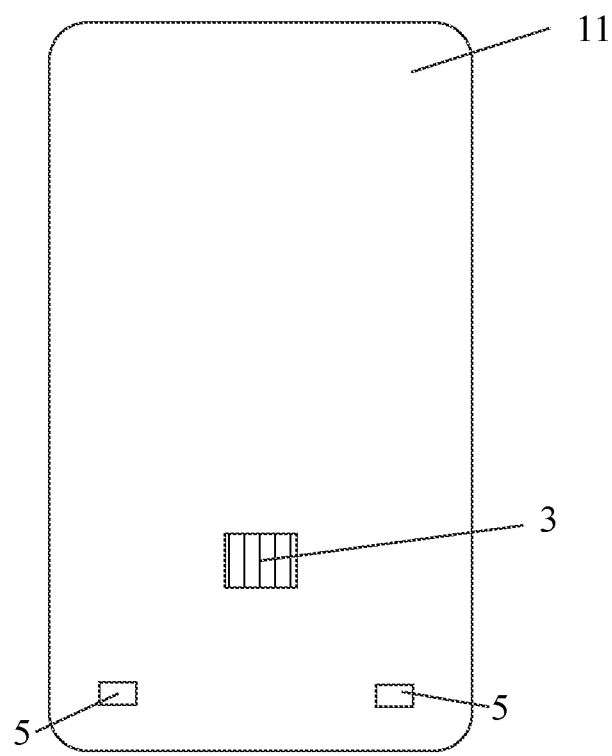
FIG. 7 to FIG. 10 are schematic views of arrangements of an infrared light source according to embodiments of the present application.

For example, as shown in FIG. 7, the under-screen fingerprint identification apparatus 10 may include two infrared light sources 5, and projection formed by the two infrared light sources 5 and the fingerprint identification module 3 on the display screen 11 is an isosceles triangle.

Figure 8:
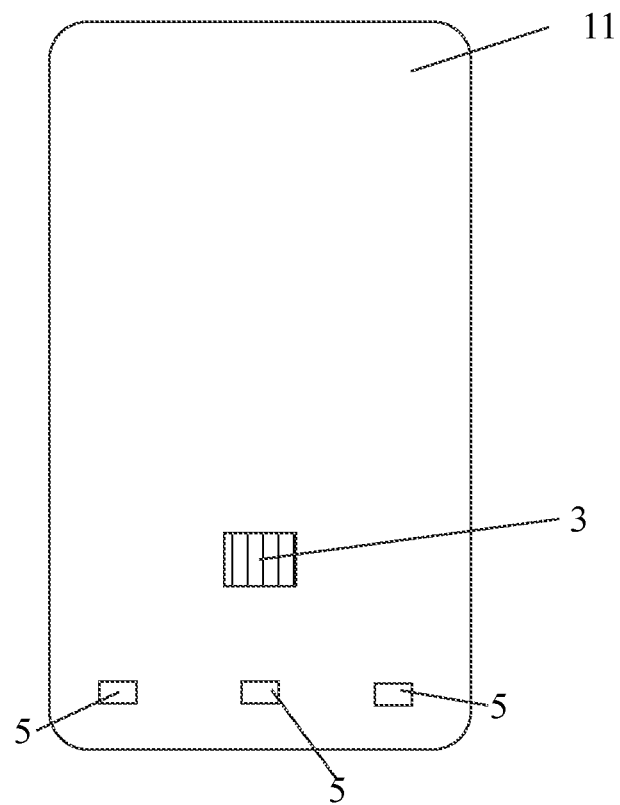

For another example, as shown in FIG. 8, the under-screen fingerprint identification apparatus 10 may include three infrared light sources 5, and projection formed by the three infrared light sources 5 and the fingerprint identification module 3 on the display screen 11 is an isosceles triangle, where the three infrared light sources 5 are arranged on a base of the isosceles triangle and symmetrically arranged.

Figure 9:
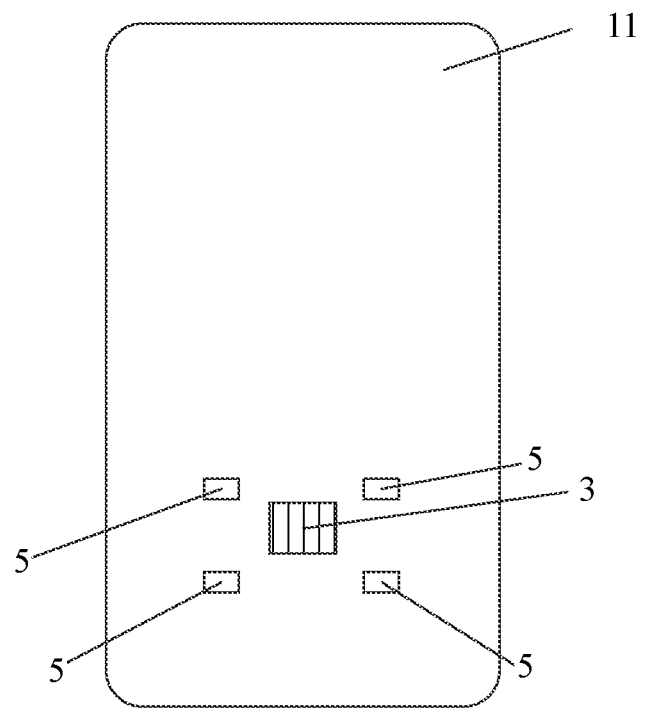

For another example, as shown in FIG. 9, the under-screen fingerprint identification apparatus 10 may include four infrared light sources 5, and projection formed by the four infrared light sources 5 on the display screen 11 is a rectangle, and the fingerprint identification module 3 is located at a center of the rectangle.

Figure 10:
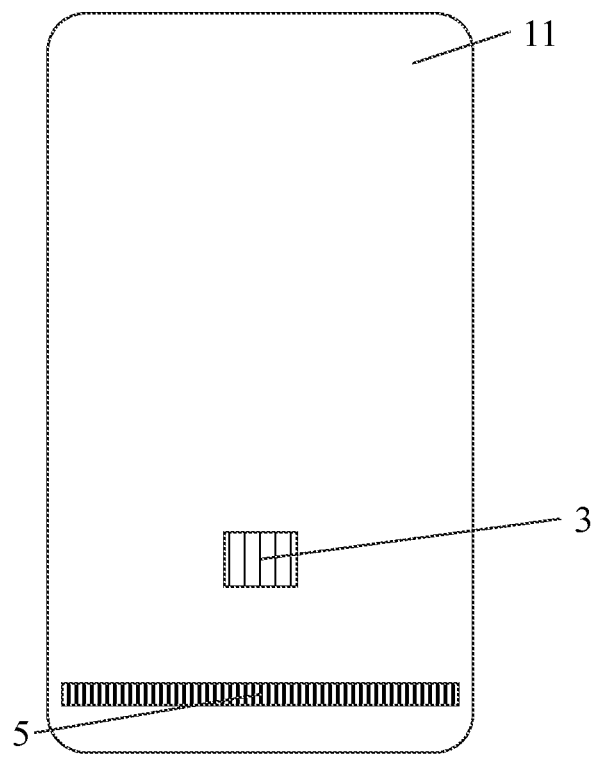

For another example, as shown in FIG. 10, the under-screen fingerprint identification apparatus 10 may include a strip-like light source, the strip-like light source may include a plurality of infrared light sources 5, and projection formed by the plurality of infrared light sources 5 and the fingerprint identification module 3 on the display screen 11 is an isosceles triangle, where the plurality of infrared light sources 5 are arranged on a base of the isosceles triangle and symmetrically arranged.

Figure 11:
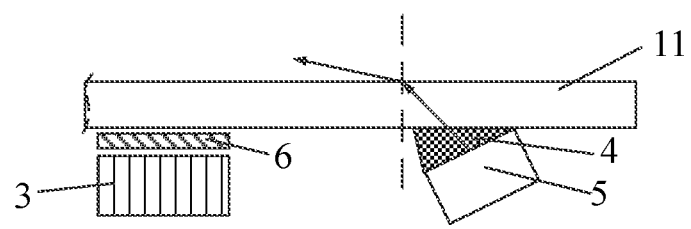
FIG. 11 and FIG. 12 are schematic views of attaching manners of an infrared light source and a display screen according to embodiments of the present application.
Figure 12:
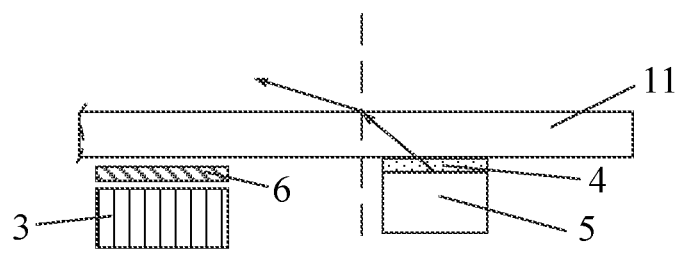

Optionally, in some embodiments of the present application, as shown in FIG. 11, the infrared light source 5 is obliquely attached to a lower surface of the display screen 11. In the embodiment of the present application, by obliquely attaching the infrared light source 5 to the lower surface of the display screen 11, a utilization ratio of the infrared light signal emitted by the infrared light source 5 in a fingerprint identification process could be effectively improved.

Optionally, in some embodiments of the present application, as shown in FIG. 11, the infrared light source 5 is flatly attached to a lower surface of the display screen 11. In the embodiment of the present application, by flatly attaching the infrared light source 5 to the lower surface of the display screen 11, an attaching process could be effectively simplified, thereby improving a yield in a product assembly process.

In the embodiment of the present application, the infrared light signal emitted by the infrared light source 5 is used for fingerprint identification. However, since there is infrared light in natural light in the environment, it is very likely that the infrared light in the environment may be transmitted to the fingerprint identification module 3 such that a part of an infrared light signal received by the fingerprint identification module 3 may not carry fingerprint information, thereby reducing identification efficiency of the fingerprint identification module 3.

Figure 13:
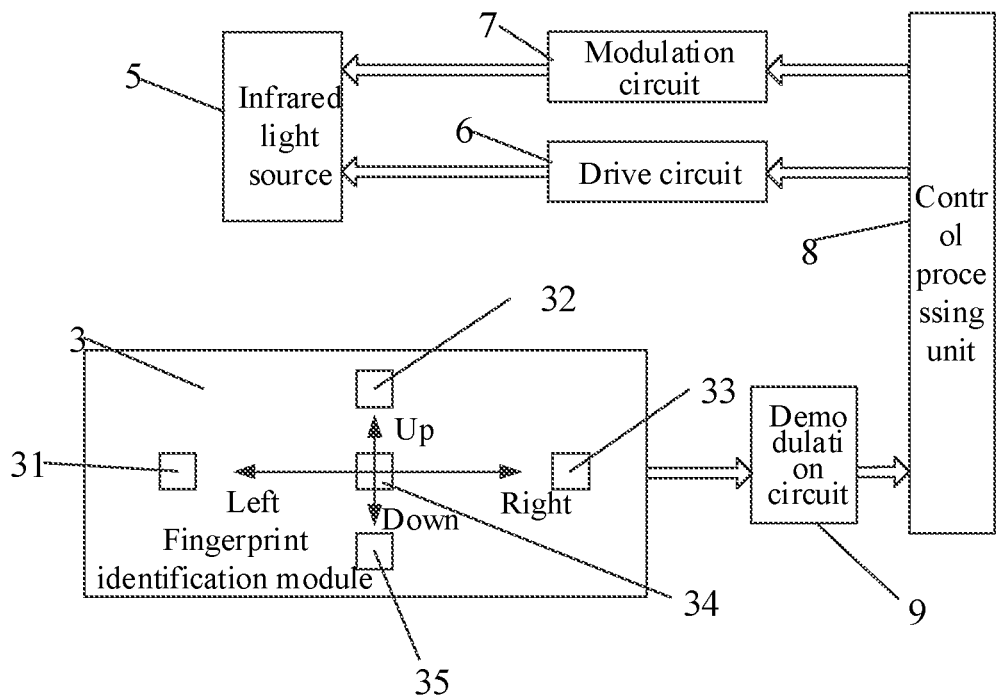
FIG. 13 is another schematic structural diagram of an under-screen fingerprint identification apparatus according to an embodiment of the present application.

FIG. 13 is another schematic block diagram of an under-screen fingerprint identification apparatus according to an embodiment of the present application.

As shown in FIG. 13, the under-screen fingerprint identification apparatus 10 may further include:

a control processing unit 8, a modulation circuit 7, a drive circuit 6 and a demodulation circuit 9;

specifically, the control processing unit 8 is connected to the infrared light source 5 through the modulation circuit 7, the control processing unit 8 is connected to the infrared light source 5 through the drive circuit 6, and the fingerprint identification module 3 is connected to the control processing unit 8 through the demodulation circuit 9; and the control processing unit 8 is configured to control the modulation circuit 7 to modulate the infrared light signal, the control processing unit 8 is further configured to control the drive circuit 6 to drive the infrared light source 5 to emit the infrared light signal, and the demodulation circuit 9 is configured to demodulate the infrared light signal received by the fingerprint identification module 3 and transmit the demodulated infrared light signal to the control processing unit 8.

In the embodiment of the present application, by modulating the infrared light source 5 by the modulation circuit 7, the infrared light signal emitted by the infrared light source 5 is distinguished from the an infrared light signal in the environment. Specifically, the infrared light source 5 may perform a turnon or turnoff operation by using a certain specific modulation frequency. Since most of light in the environment may be regarded as an optical signal with a very small frequency or a very slow frequency change, the influence of strong light in the environment may be well shielded by using a method of modulation. Correspondingly, since light emitted by the infrared light source 5 has a specific frequency, the signal captured by the fingerprint identification module 3 also includes the relevant modulation frequency. In the embodiment of the present application, the signal may be restored by the demodulation circuit 9 and then transmitted to the control processing unit 8 to facilitate fingerprint identification by the control processing unit 8.

Optionally, in some embodiments of the present application, a capturing area of the fingerprint identification module 3 is located in the display screen 11, and the capturing area may include a plurality of capturing blocks.

For example, as shown in FIG. 13, the capturing area may include a capturing block 31, a capturing block 32, a capturing block 33, a capturing block 34 and a capturing block 35.

Based on the foregoing description, an embodiment of the present application further provides a backlight module for under-screen fingerprint identification, for example, the backlight module 20 shown in FIG. 3. The backlight module 20 is configured to transmit an infrared light signal that is emitted by an infrared light source 5 and illuminates a human finger to a fingerprint identification module 3, and the infrared light signal is used to detect fingerprint information of the finger; where the backlight module 20 has a smaller haze for the infrared light signal than for visible light for image display.

Optically, in some embodiments of the present application, the backlight module 20 may include a diffusion layer 23, where a haze of the infrared light signal passes through the diffusion layer 23 is less than a haze of the visible light passes through the diffusion layer 23.

Optically, in some embodiments of the present application, light transmittance of the infrared light signal passes through the diffusion layer 23 is greater than light transmittance of the visible light passes through the diffusion layer 23.

Optically, in some embodiments of the present application, the backlight module may include a reflection layer 25, where light transmittance of the infrared light signal passes through the reflection layer 25 is greater than light transmittance of the visible light passes through the reflection layer 25.

Optionally, in some embodiments of the present application, the backlight module 20 may include a steel plate 26, where the steel plate 26 is provided with a hole 261, and the fingerprint identification module 3 is disposed under the hole 261 and configured to receive an infrared light signal passing through the hole 261 that is emitted by the infrared light source 5 and illuminates the human finger.

It should be understood that the specific optical characteristics of the backlight module 20 in the embodiment of the present application may refer to the corresponding description in FIG. 3, and no further details are provided herein for brevity.

An embodiment of the present application further provides an electronic device, and the electronic device may include the under-screen fingerprint identification apparatus described above, for example, the under-screen fingerprint identification apparatus 10 shown in FIG. 10. Optionally, in some embodiments of the present application, the under-screen fingerprint identification apparatus 10 may further include a fingerprint identification module 3, the electronic device may further include: the backlight module described above, for example, the backlight module 20 shown in FIG. 3, and the fingerprint identification module 3 is disposed under the backlight module 20.

An embodiment of the present application further provides an electronic device, and the electronic device may include the backlight module described above, for example, the backlight module 20 shown in FIG. 3. Further, as shown in FIG. 3, the electronic device may further include: a fingerprint identification module 3, an infrared light source 5 and a display screen 11. the backlight module 20 and the infrared light source are disposed under the display screen 11, and the fingerprint identification module 3 is disposed under the backlight module 20; and the fingerprint identification module 3 is configured to receive an infrared light signal passing through the backlight module 20 that is emitted by the infrared light source 5 and illuminates a human finger, and the infrared light signal is used to detect fingerprint information of the finger.

The under-screen fingerprint identification apparatus 10 and the backlight module 20 of the embodiment of the present application are described in detail above, and a specific fingerprint identification method based on a case that the capturing area of the fingerprint identification module includes a plurality of capturing blocks will be described below.

Figure 14:
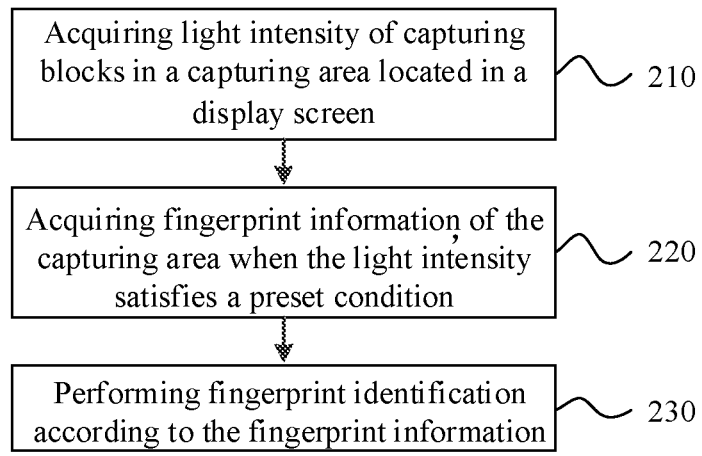
FIG. 14 and FIG. 15 are schematic flowcharts of an under-screen fingerprint identification method according to embodiments of the present application.

FIG. 14 is a schematic flowchart of a method 200 for fingerprint identification according to an embodiment of the present application. The method 200 may be performed by the mobile terminal 100 described in FIG. 1 or FIG. 2, the fingerprint identification apparatus 10 shown in FIG. 3, or the fingerprint identification module 3 in the fingerprint identification apparatus 10. For convenience of description, the following will be described by an example of the fingerprint identification apparatus 10. Optionally, the fingerprint identification apparatus 10 or the terminal device 100 is triggered to perform the method 200 after the fingerprint identification module 3 is initialized by a user, and the method 200 includes some or all of the following contents:

210, acquiring light intensity of capturing blocks in a capturing area located in a display screen;

220, acquiring fingerprint information of the capturing area when the light intensity satisfies a preset condition; and 230, performing fingerprint identification according to the fingerprint information.

Specifically, in the process of initializing the fingerprint identification module 3 by the user, a capturing area of the fingerprint identification module 3 that is located in the display screen 11 may include a plurality of capturing blocks. For example, as shown in FIG. 13, the capturing area may include a capturing block 31, a capturing block 32, a capturing block 33, a capturing block 34 and a capturing block 35. The fingerprint identification apparatus 10 may determine whether to trigger the fingerprint identification module 3 to perform a fingerprint capturing operation based on whether the light intensity of the capturing block 31, the capturing block 32, the capturing block 33, the capturing block 34 and the capturing block 35 satisfies a preset condition.

In the embodiment of the present application, since whether to trigger the fingerprint identification apparatus 10 to perform capturing of fingerprint data is determined according to only the light intensity of a part of the capturing area, workloads of data processing could be effectively reduced, and a speed of response is improved.

Optionally, in some embodiments of the present application, the fingerprint identification apparatus 10 acquires the fingerprint information when a variation of the light intensity is greater than or equal to a preset threshold. For example, the preset threshold may be a preset light intensity change threshold.

Optionally, in some embodiments of the present application, the fingerprint identification apparatus 10 acquires the fingerprint information when an intensity value of the light intensity is greater than or equal to a preset intensity threshold.

Further, different intensity thresholds may be set in different scenes. For example, a greater intensity threshold may be set in a scene with strong ambient light (such as day). For another example, a less intensity threshold may be set in a scene with weak ambient light (such as night or cloudy day). Accuracy of the fingerprint information acquired by the fingerprint identification apparatus 10 triggered by the intensity value of the light intensity could by effectively improved by the foregoing technical solution.

Optionally, in some embodiments of the present application, the fingerprint identification apparatus 10 acquires the fingerprint information when the intensity value or the variation of the light intensity is within a preset range.

It should be understood that the preset threshold of the embodiment of the present application is a triggering threshold of the fingerprint identification apparatus 10 for performing a fingerprint identification operation. The preset threshold is merely an example, and the embodiment of the present application is not limited thereto. For example, in other alternative embodiments, the triggering threshold of the fingerprint identification apparatus may also be a threshold dynamically adjusted based on the preset threshold.

Optionally, in some embodiments of the present application, the light intensity is acquired through a photoelectric sensor. For example, the photoelectric sensor may be a photodiode (PD).

Optionally, in some embodiments of the present application, before the fingerprint identification apparatus 10 acquires the light intensity of the capturing blocks in the capturing area located in the display screen, the fingerprint identification apparatus 10 acquires an infrared light signal reflected by a human finger; and the fingerprint identification apparatus 10 adjusts a detection range of the photoelectric sensor when the infrared light signal is not within the detection range of the photoelectric sensor.

For example, an output signal of the photoelectric sensor ranges from 0 to 1 A. When an optical signal received by the photoelectric sensor is weak, the fingerprint identification apparatus 10 may adjust the range of the output signal of the photoelectric sensor to 0~100 mA. In the embodiment of the present application, by adjusting the detection range of the photoelectric sensor, detection accuracy of the photoelectric sensor could be effectively improved.

Optionally, in some embodiments of the present application, the photoelectric sensor is further configured to detect fingerprint information or heart rate information.

It should be understood that the embodiment of the present application is described by an example that when the light intensity of the capturing blocks satisfies the present condition, the fingerprint identification apparatus 10 is triggered to acquire the fingerprint information of the capturing area, and the embodiment of the present is not limited thereto. For example, whether to trigger the fingerprint identification apparatus 10 to acquire the fingerprint information of the capturing area may be determined in combination with other conditions. The following describes an implementation manner in which the fingerprint identification apparatus 10 triggers a capturing operation of fingerprint data in combination with other conditions.

Optionally, in some embodiments of the present application, the fingerprint identification apparatus 10 acquires the fingerprint information when the light intensity satisfies the preset condition and it is determined that the display screen is not shielded.

Optionally, in some embodiments of the present application, before the fingerprint identification apparatus 10 acquires the fingerprint information, the fingerprint identification apparatus 10 determines whether the display screen is shielded through an illuminance sensor.

Figure 15:
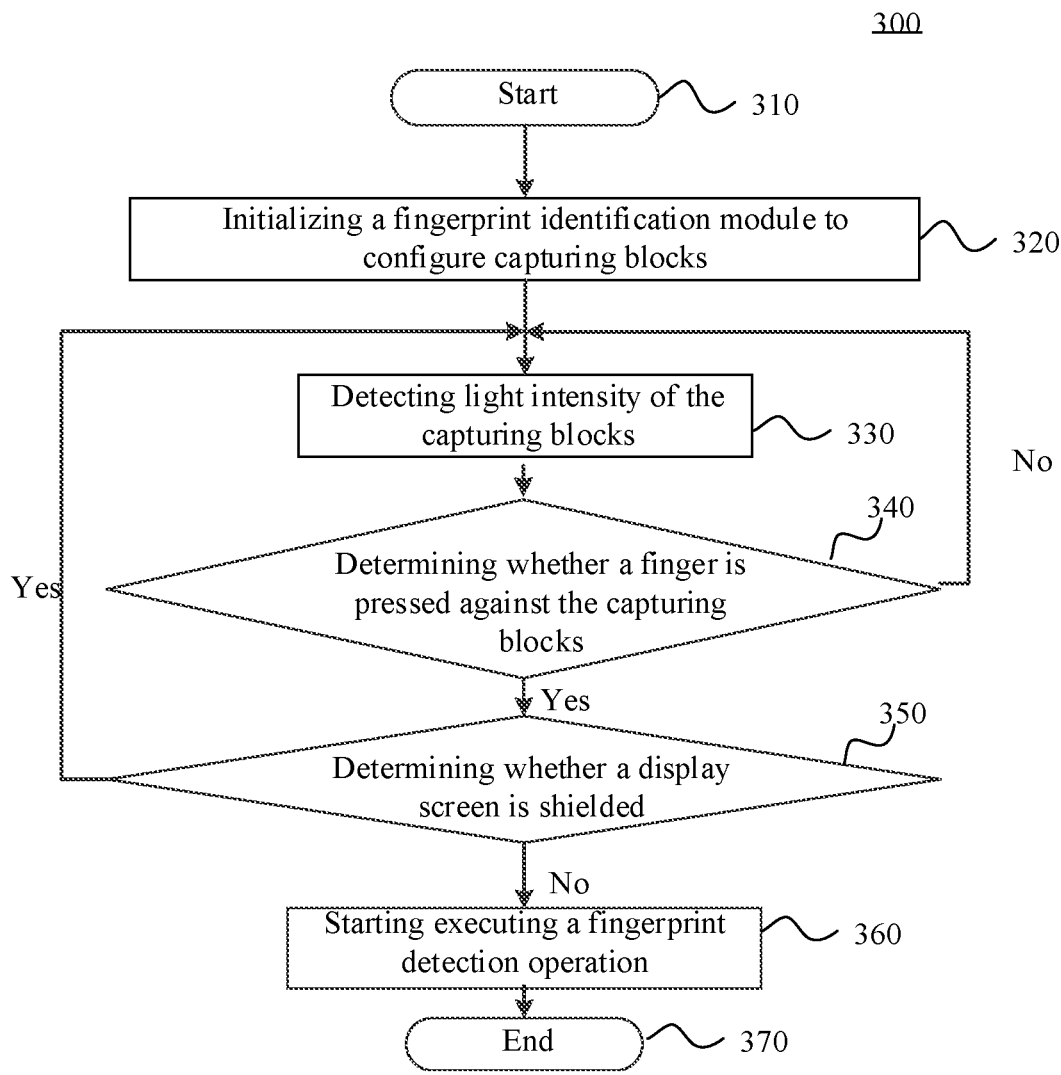

FIG. 15 is a schematic flowchart of a method 300 for fingerprint identification according to an embodiment of the present application. The method 300 may be performed by the mobile terminal 100 described in FIG. 1 or FIG. 2, the under-screen fingerprint identification apparatus 10 shown in FIG. 3, or the fingerprint identification module 3 in the fingerprint identification apparatus 10. For convenience of description, the following will be described by an example of the fingerprint identification apparatus 10. As shown in FIG. 15, the method 300 includes some or all of the following contents:

310, start;

320, the under-screen fingerprint identification apparatus 10 initializes a fingerprint identification module 20 to configure capturing blocks; specifically, as shown in FIG. 13, the fingerprint identification module 20 is initialized, and a capturing block 31, a capturing block 32, a capturing block 33, a capturing block 34 and a capturing block 35 are configured.

330, the under-screen fingerprint identification apparatus 10 detects light intensity of the capturing blocks;

340, the under-screen fingerprint identification apparatus 10 determines whether a finger is pressed against the capturing blocks;

350, the under-screen fingerprint identification apparatus 10 determines whether a display screen is shielded when it is determined that the finger is pressed against the capturing blocks; in contrast, the under-screen fingerprinting identification apparatus 10 performs 330 when it is determined that the finger is not pressed against the capturing blocks;

360, the under-screen fingerprinting identification apparatus 10 starts performing a fingerprint detection operation when the display screen is not shielded; in contrast, the under-screen fingerprinting identification apparatus 10 performs 330 when the display screen is shielded; and

370, end.

Optionally, in some embodiments of the present application, the fingerprint identification apparatus 10 acquires the fingerprint information when the light intensity satisfies the preset condition and a press force with which a human finger is pressed against the capturing blocks is greater than or equal to a pressure threshold.

Specifically, in a case that the light intensity satisfies the present condition, a pressure value may be generated by pressing the display screen of a fingerprint capturing area 130 by a user, a capturing operation of fingerprint data is triggered when the pressure value is greater than or equal to the pressure threshold, and in contrast, the capturing operation of fingerprint data is not triggered when the pressure value is less than the triggering threshold.

In other words, when the user needs to unlock or perform other fingerprint verification on the terminal device 100, in order to ensure quality of the acquired fingerprint data, it is necessary to control whether to trigger the capturing operation of fingerprint data through a pressure threshold.

Further, the pressure threshold may be a preset threshold, or may be a threshold determined before the fingerprint identification apparatus 10 captures the fingerprint data.

Optionally, in some embodiments of the present application, before the fingerprint identification apparatus 10 acquires the fingerprint information, the fingerprint identification apparatus 10 may acquire the press force with which the human finger is pressed against the capturing blocks through a pressure sensor. The pressure sensor includes, but is not limited to, a capacitive pressure sensor or a resistive pressure sensor.

Figure 16:
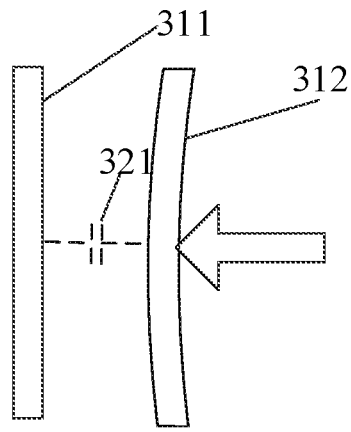
FIG. 16 to FIG. 18 are schematic diagrams of a pressure sensor according to embodiments of the present application.

The capacitive pressure sensor may also be referred to as a "pressure-capacitance" sensor, the principle of which is shown in FIG. 16. When pressure is applied to a polar plate 312, the pressure causes spacing of a capacitors 321 between the two polar plates 311 and 312 to change, thereby changing a capacitance value. Different pressures produce different capacitance value changes, a variation of the capacitance value is converted into an electrical signal, and the corresponding pressure may be detected by detecting the change of the signal by the detecting chip.

Figure 17:
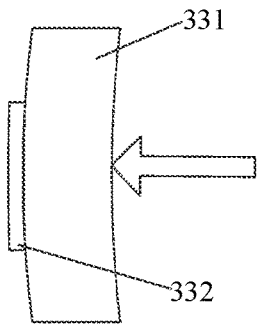

The resistive pressure sensor may also be referred to as a "piezoresistive" sensor, the principle of which is shown in FIG. 17. The resistive pressure sensor 332 is disposed on a certain force receiving surface to be detected, and the force bearing body 331 is deformed by force to squeeze or stretch the resistive pressure sensor 332 so that its resistance value changes accordingly. Different pressures produce different resistance value changes, and the corresponding force could be detected by detecting the change of the resistance value by the detecting chip.

Figure 18:
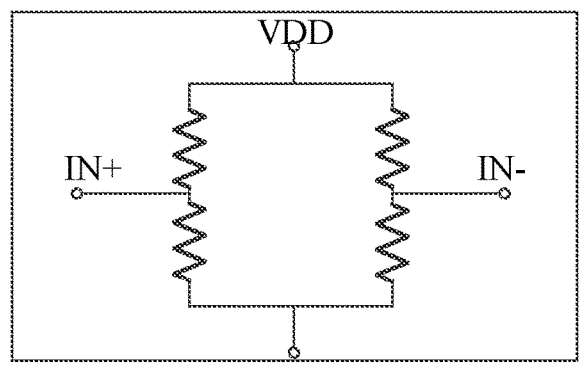

As shown in FIG. 18, four independent resistive pressure sensors are combined into a bridge topology to form a bridge resistance pressure sensor, which is capable of suppressing hardware-level temperature drift. IN+ represents a positive input of a data signal, IN− represents a negative input of the data signal, and VDD represents an input voltage.

In practical applications, since a single pressure sensor is usually small, in order to sense the pressure from various positions of the touch display screen as accurately as possible, it is usually necessary to place a plurality of pressure sensors in a form of an array, and the plurality of pressure sensors constitute a pressure sensor array.

Optionally, in some embodiments of the present application, the fingerprint identification apparatus 10 acquires the fingerprint information when the light intensity satisfies the preset condition and an object pressed against the capturing blocks is a living body.

Optionally, in some embodiments of the present application, before the fingerprint identification apparatus 10 acquires the fingerprint information, heart rate information may be acquired by a living body detection unit; and whether the object pressed against the capturing blocks is a living body is determined according to the heart rate information.

Figure 19:
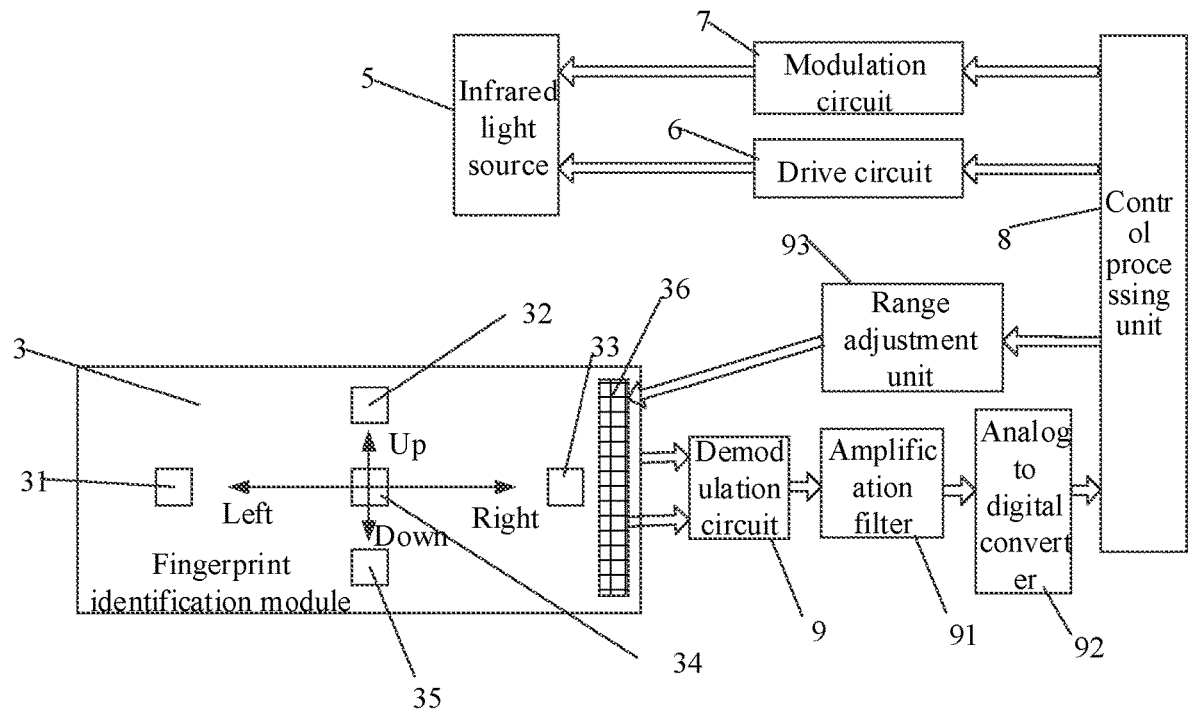
FIG. 19 is another schematic structural diagram of an under-screen fingerprint identification apparatus according to an embodiment of the present application.

FIG. 19 is a schematic diagram of an under-screen fingerprint identification apparatus having a living body detection unit according to an embodiment of the present application. As shown in FIG. 19, the under-screen fingerprint identification apparatus may include:

a fingerprint identification module 3, where the fingerprint identification module 3 may include a living body detection unit 36. The living body detection unit 36 is configured to acquire heart rate information, and determine whether the object pressed against the capturing blocks is a living body according to the heart rate information.

Specifically, the living body detection unit 36 may include at least one photoelectric sensor.

Further, as shown in FIG. 19, the under-screen fingerprint identification apparatus may further include:

a range adjustment unit 93 configured to adjust the detection range of the photoelectric sensor.

Further, as shown in FIG. 19, the under-screen fingerprint identification apparatus may further include:

an amplification filter circuit 91 and an analog to digital converter circuit 92.

After an optical signal for carrying the heart rate information is acquired, the biometric detection unit 36 converts the optical signal into an electrical signal and transmits the electrical signal to the demodulation circuit 9, the demodulation circuit demodulates the electric signal and transmits the demodulated electrical signal to the amplification filter circuit 91, the demodulated electrical signal is transmitted to the analog to digital converter circuit 92 via the amplification filter circuit 91 so that the analog to digital converter circuit 92 transmits a converted digital signal to the control processing unit 8 for fingerprint identification by the control processing unit 8.

Figure 20:
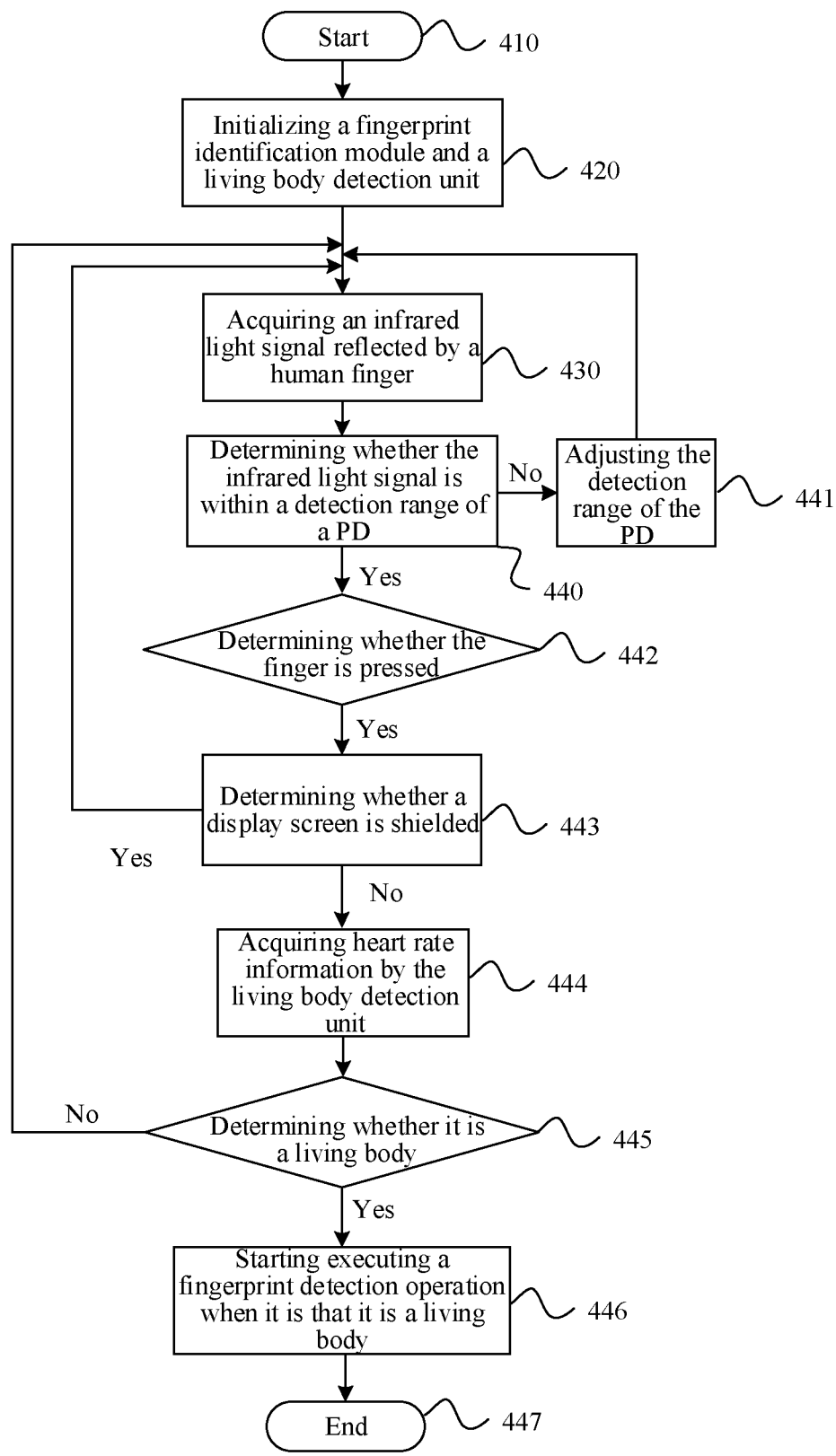
FIG. 20 and FIG. 21 are other schematic flowcharts of an under-screen fingerprint identification method according to embodiments of the present application.

FIG. 20 is a schematic flowchart of a method 400 for fingerprint identification according to an embodiment of the present application. The method 400 may be performed by the mobile terminal 100 described in FIG. 1 or FIG. 2, the under-screen fingerprint identification apparatus 10 shown in FIG. 3, or the fingerprint identification module 3 in the fingerprint identification apparatus 10. For convenience of description, the following will be described by an example of the fingerprint identification apparatus 10. As shown in FIG. 20, the method 400 includes some or all of the following contents:

as shown in FIG. 20, the method 400 for identifying a fingerprint may include:

410, start;

420, the under-screen fingerprint identification apparatus 10 initializes a fingerprint identification module and a loving body detection unit;

430, the under-screen fingerprint identification apparatus 10 acquires an infrared light signal reflected by a human finger;

440, the under-screen fingerprint identification apparatus 10 determines whether the infrared light signal is within a detection range of a photodiode (PD);

441, the under-screen fingerprint identification apparatus 10 adjusts the detection range of the PD when it is determined that the infrared light signal is not within the detection range of the PD;

442, the under-screen fingerprint identification apparatus 10 determines whether the finger is pressed when the under-screen fingerprint identification apparatus 10 determines that the infrared light signal is within the detection range of the PD; In 430 of the embodiment of the present application, when the light intensity of the infrared light signal acquired by the under-screen fingerprint identification apparatus 10 satisfies a preset condition, it may be determined that a finger is pressed in the capturing area of the display screen; otherwise, it is determined that no finger is pressed in the capturing area of the display screen;

443, the under-screen fingerprint identification apparatus 10 determines whether the display screen is shielded;

444, the heart rate information is acquired by the living body detection unit when the under-screen fingerprint identification apparatus 10 determines that the display screen is not shielded; in contrast, the under-screen fingerprint identification apparatus 10 performs 430 when it is determined that the display screen is shielded;

445, the under-screen fingerprint identification apparatus 10 determines whether an object pressed against the display screen is a living body;

446, the under-screen fingerprinting identification apparatus 10 starts performing a fingerprint detection operation when it is determined that the object pressed against the display screen is a living body; in contrast, the under-screen fingerprint identification apparatus 10 performs 430 when it is determined that the object pressed against the display screen is not a living body; and 447, end.

It should be understood that in the method 400 for identifying a fingerprint shown in FIG. 20, the process that the under-screen fingerprint identification apparatus 10 acquires the infrared light signal reflected by the human finger may be specifically performed by the living body detection unit 36 shown in the drawing. Further, the living body detection unit 36 is further configured to determine whether the object pressed against the display screen is a living body. The embodiment of the present application is not limited thereto.

It should be noted that the principle of triggering the under-screen fingerprint identification apparatus 10 to acquire the fingerprint information of the capturing area in combination with the photoelectric sensor, the pressure sensor, the illuminance sensor and the living body detection unit is described in detail above. Optionally, in some embodiments of the present application, when a certain condition is satisfied, the under-screen fingerprint identification apparatus 10 is triggered to acquire the fingerprint information of the capturing area in combination with the photoelectric sensor, the pressure sensor, the illuminance sensor and the living body detection unit. In other words, in the embodiment of the present application, when a certain condition is satisfied, the under-screen fingerprint identification apparatus 10 is triggered to acquire the light intensity.

Optionally, in some embodiments of the present application, the under-screen fingerprint identification apparatus 10 acquires the light intensity when it is determined that a display interface of the display screen is a fingerprint verification interface.

Specifically, before the under-screen fingerprint identification apparatus 10 acquires the light intensity of the capturing blocks in the capturing area located in the display screen, the under-screen fingerprint identification apparatus 10 needs to determine whether the display interface of the display screen is a fingerprint verification interface, and the under-screen fingerprint identification apparatus 10 acquires the light intensity of the capturing blocks in the capturing area located in the display screen when it is determined that the display interface of the display screen is a fingerprint verification interface.

The fingerprint verification interface includes an identification of the capturing area so that the user presses the capturing area in the display screen according to the identification. For example, the identification may be a fingerprint image or an another form of an image formed at the capturing position within the display screen. When the display interface of the display screen is the fingerprint verification interface, the user may be guided to perform fingerprint capturing.

Optionally, in some embodiments of the present application, after the user presses a power button, the display interface of the display screen is switched to the fingerprint verification interface.

Optionally, in some embodiments of the present application, after the user touches the display screen, the display interface of the display screen is switched to the fingerprint verification interface.

It should be understood that the process of switching the display interface to the fingerprint verification interface in the embodiment of the present application may be performed by the terminal device 100, may be performed by the fingerprint identification apparatus 10, or may be performed by the fingerprint identification module 3 in the fingerprint identification apparatus 10, which is not specifically limited in this embodiment of the present application.

Figure 21:
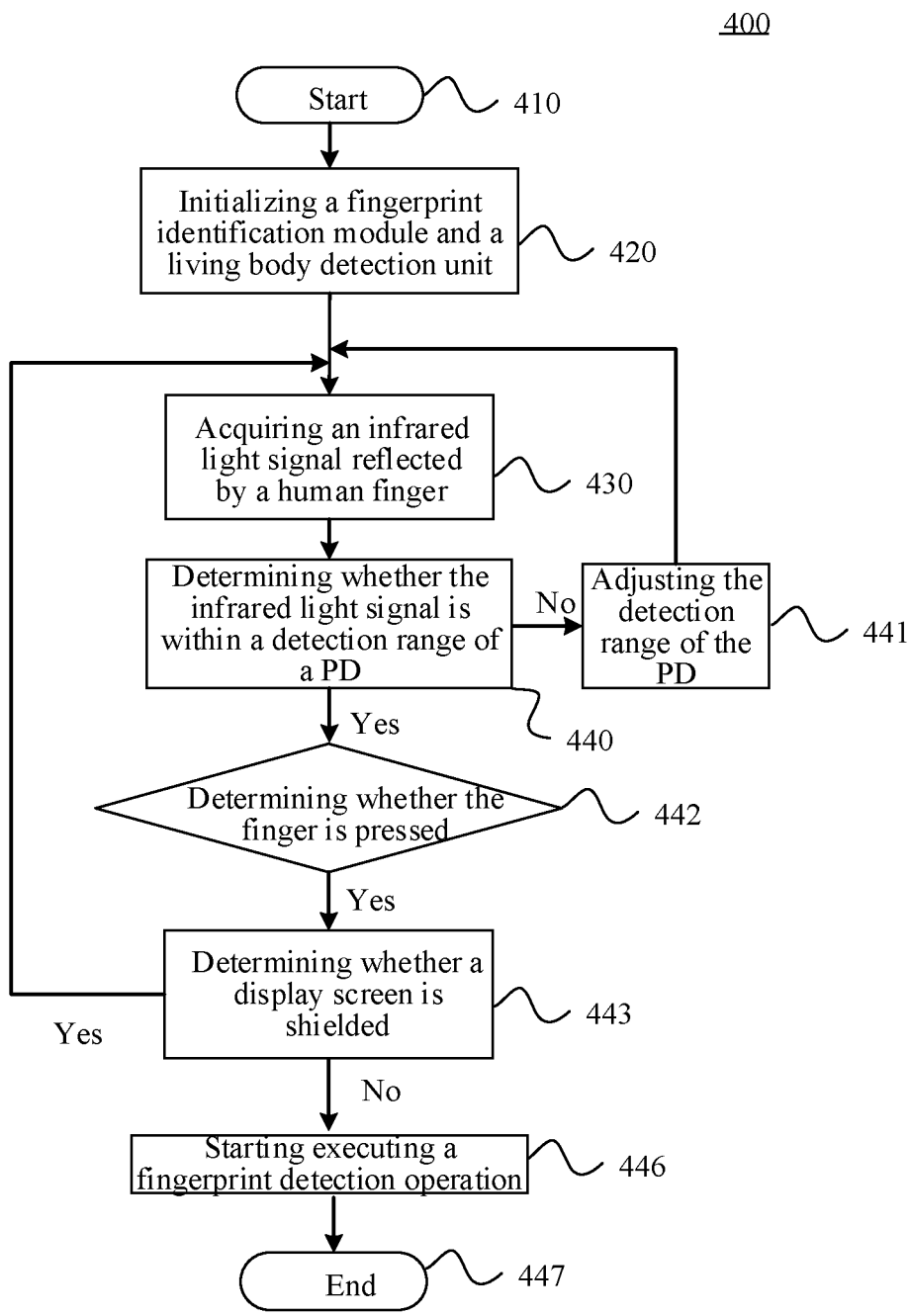

For example, as shown in FIG. 21, the living body detection unit 36 is only configured to determine whether a finger is pressed by acquiring an infrared light signal reflected by the human finger, that is, whether light intensity of the infrared light signal satisfies a preset condition. That is, the living body detection unit 36 may not be used for living body identification after 443.

Optionally, in some embodiments of the present application, the under-screen fingerprint identification apparatus may further executes a target application corresponding to a first press order according to the first press order in which the human finger is pressed against the plurality of blocks and mapping relationship information, where the mapping relationship information includes a correspondence between at least one press order and at least one application, and the at least one press order includes the first press order. It should be understood that the first press order of the embodiment of the present application may be an order in which the human finger is pressed against the plurality of blocks, or may be an order in which another object (such as a stylus) is pressed against the plurality of blocks. This is not limited in the embodiment of the present application.

Figure 22:
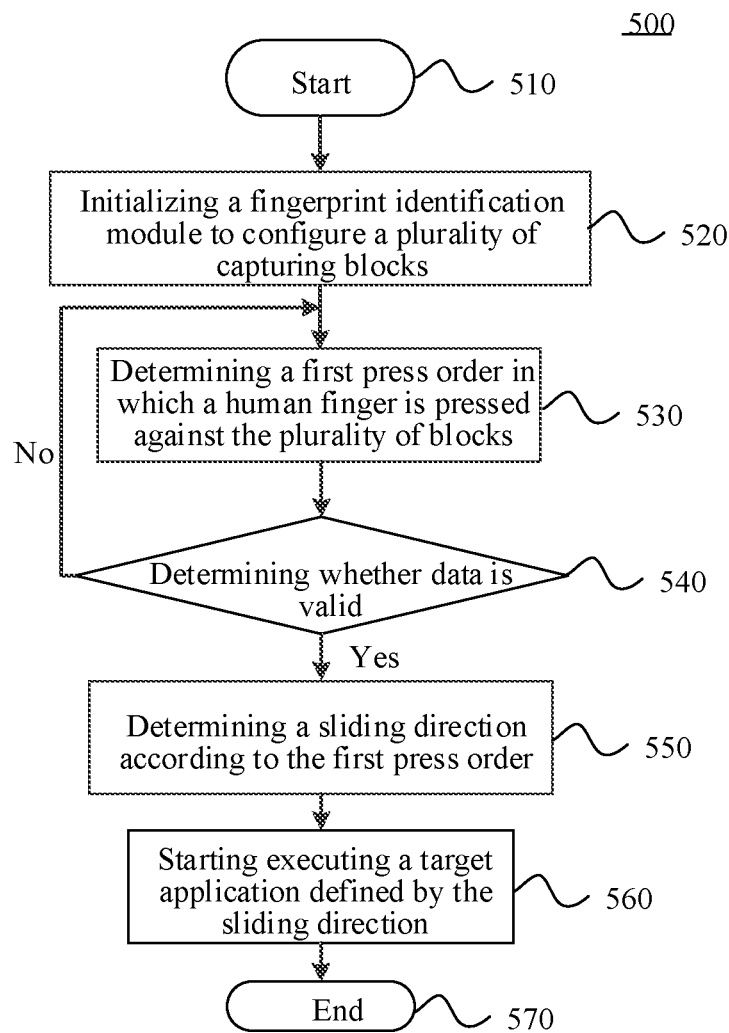
FIG. 22 is a schematic flowchart of an application operation method according to an embodiment of the present application.

FIG. 22 is a schematic flowchart of a method 500 of executing an application by a fingerprint identification apparatus according to a first press order according to an embodiment of the present application. The method 500 may be performed by the mobile terminal 100 described in FIG. 1 or FIG. 2, or may be performed by the control processing unit 8 shown in FIG. 13 or FIG. 19. For convenience of description, the following is described by an example of the mobile terminal 100. As shown in FIG. 22, the method 500 includes some or all of the following contents:

510, start;

520, the mobile terminal 100 initializes a fingerprint identification module to configure a plurality of capturing blocks;

530, the mobile terminal 100 determines a first press order in which a human finger is pressed against the plurality of blocks;

540, the mobile terminal 100 determines whether data is valid; in the embodiment of the present application, the mobile terminal 100 may determine whether the data is valid according to whether light intensity of each capturing block satisfies a preset condition; specifically, if the light intensity of the capturing block satisfies the preset condition, the data in the capturing block is valid; if the light intensity of the capturing block does not satisfy the preset condition, the data in the capturing block is invalid;

550, the mobile terminal 100 determines a sliding direction according to the first press order;

560, the mobile terminal 100 starts executing a target application defined by the sliding direction; in the embodiment of the present application, a correspondence between a sliding direction and an application may be preset; after determining the sliding direction, the mobile terminal 100 may directly execute the application corresponding to the sliding direction; and 570, end.

The preferred embodiments of the present application are described in detail above with reference to the accompanying drawings. However, the present application is not limited to specific details in the foregoing embodiments. Within the technical concept of the present application, a variety of simple variants may be carried out on the technical solution of the present application, and all of the simple variants are within the protection scope of the present application.

For example, various specific technical features described in the foregoing specific embodiments may be combined in any suitable manner under the condition of no contradiction. In order to avoid unnecessary repetition, various possible combination ways will not be separately described in the present application.

For another example, any combination may be made between various embodiments of the present application without departing from the idea of the present application, and it should also be regarded as the disclosure of the present application.

It should be further understood that, in various method embodiments of the present application, values of sequence numbers of the above-mentioned various processes do not mean an order of execution which should be determined based upon functionalities and internal logics thereof, rather than setting any limitation to implementation of the embodiment of the present application.

Method embodiments of the present application are described in detail above, and apparatus embodiments of the present application will be described in detail with reference to FIGS. 23 to 25 below.

Figure 23:
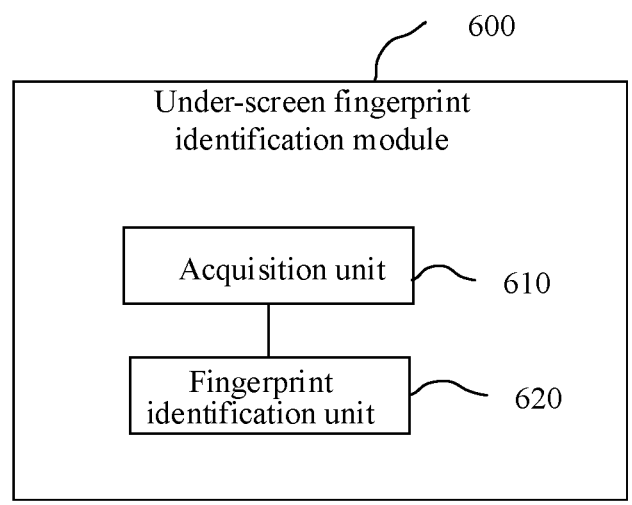
FIG. 23 is another schematic structural diagram of an under-screen fingerprint identification apparatus according to an embodiment of the present application.

FIG. 23 is a schematic block diagram of an under-screen fingerprint identification apparatus 600 according to an embodiment of the present application. As shown in FIG. 23, the under-screen fingerprint identification apparatus 600 may include:

an acquisition unit 610 configured to:

acquire light intensity of capturing blocks in a capturing area located in a display screen; and acquire fingerprint information of the capturing area when the light intensity satisfies a preset condition; and a fingerprint identification unit 620 configured to perform fingerprint identification according to the fingerprint information.

Optionally, in some embodiments of the present application, the acquisition unit 610 is specifically configured to: acquire the fingerprint information when a variation of the light intensity is greater than or equal to a preset threshold.

Optionally, in some embodiments of the present application, the acquisition unit 610 is specifically configured to: acquire the light intensity through a photoelectric sensor.

Optionally, in an embodiment of the present application, the under-screen fingerprint identification apparatus further includes: a range adjustment unit configured to:

acquire, before the acquisition unit 610 acquires the light intensity, an infrared light signal reflected by a human finger; and adjust a detection range of the photoelectric sensor when the infrared light signal is not within the detection range of the photoelectric sensor.

Optionally, in some embodiments of the present application, the photoelectric sensor is further configured to detect fingerprint information or heart rate information.

Optionally, in some embodiments of the present application, the acquisition unit 610 is specifically configured to: acquire the fingerprint information when the light intensity satisfies the preset condition and a press force with which a human finger is pressed against the capturing blocks is greater than or equal to a pressure threshold.

Optionally, in some embodiments of the present application, the under-screen fingerprint identification apparatus further includes: a pressure sensor configured to acquire, before the acquisition unit 610 acquires the fingerprint information, the press force with which the human finger is pressed against the capturing blocks.

Optionally, in some embodiments of the present application, the acquisition unit 610 is further configured to: acquire the fingerprint information when the light intensity satisfies the preset condition and it is determined that the display screen is not shielded.

Optionally, in some embodiments of the present application, the under-screen fingerprint identification apparatus further includes: an illuminance sensor configured to determine, before the acquisition unit 610 acquires the fingerprint information, whether the display screen is shielded.

Optionally, in some embodiments of the present application, the acquisition unit 610 is specifically configured to: acquire the fingerprint information when the light intensity satisfies the preset condition and an object pressed against the capturing blocks is a living body.

Optionally, in some embodiments of the present application, the under-screen fingerprint identification apparatus further includes: a living body detection unit configured to: acquire heart rate information before the acquisition unit 610 acquires the fingerprint information; and determine whether the object pressed against the capturing blocks is a living body according to the heart rate information.

Optionally, in some embodiments of the present application, the capturing blocks include a plurality of blocks.

Optionally, in some embodiments of the present application, the under-screen fingerprint identification apparatus 600 may further include: an execution unit configured to execute a target application corresponding to a first press order according to the first press order in which a human finger is pressed against the plurality of blocks and mapping relationship information, where the mapping relationship information includes a correspondence between at least one press order and at least one application, and the at least one press order includes the first press order.

Optionally, in some embodiments of the present application, the acquisition unit 610 is specifically configured to:

acquire the light intensity when it is determined that a display interface of the display screen is switched to a fingerprint verification interface, where the fingerprint verification interface includes an identification of the capturing area.

Optionally, in some embodiments of the present application, the under-screen fingerprint identification apparatus 600 may further include:

a switching unit configured to switch, after a user presses a power button, the display interface of the display screen to the fingerprint verification interface.

Optionally, in some embodiments of the present application, the under-screen fingerprint identification apparatus 600 may further include:

a switching unit configured to switch, after a user touches the display screen, the display interface of the display screen to the fingerprint verification interface.

It should be understood that apparatus embodiments and method embodiments may correspond to each other, and similar descriptions may refer to the method embodiments. Specifically, the under-screen fingerprint identification apparatus 600 shown in FIG. 23 may correspond to a corresponding subject for executing the method of the embodiment of the present application, the foregoing and other operations and/or functions of the respective units in the under-screen fingerprint identification apparatus 600 are receptively to implement the corresponding flow of the various methods in FIG. 14, FIG. 15, FIG. 20 to FIG. 22, which is not repeatedly described here for brevity.

The apparatus for fingerprint identification according to the embodiment of the present application is described above with reference to FIG. 23 from the perspective of a functional module. It should be understood that the functional module may be implemented by hardware, by an instruction in a form of software, or by a combination of hardware and software modules.

Specifically, steps of the method embodiments in the embodiments of the present application may be completed by using an integrated logical circuit of hardware in the processor and/or an instruction in a form of software. Steps of the methods disclosed in the embodiments of the present application may be directly executed and completed by using a hardware decoding processor, or may be executed and completed by using a combination of hardware and software modules in the decoding processor.

Optionally, the software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps of the foregoing method embodiments in combination with hardware of the processor.

For example, in the embodiment of the present application, the acquisition unit 610 shown in FIG. 23 may be implemented by a fingerprint identification module, and the fingerprint identification unit 620 shown in FIG. 23 may be implemented by a processor.

Figure 24:
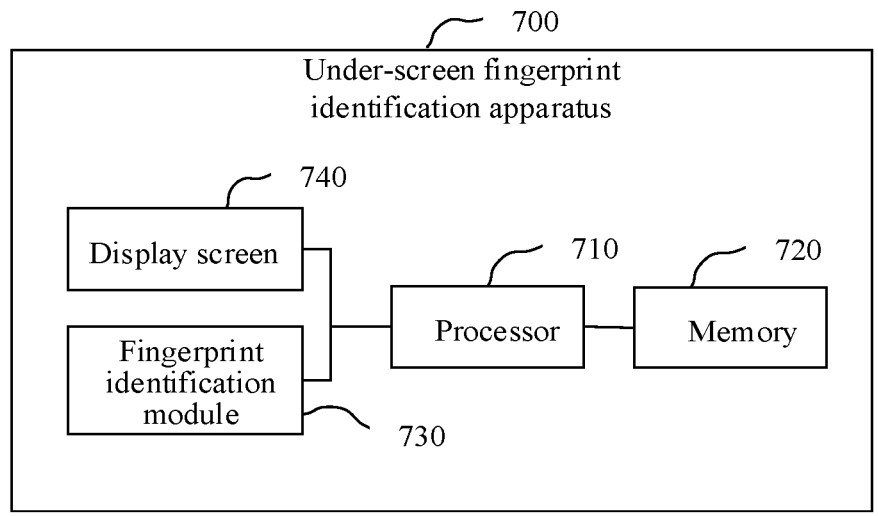
FIG. 24 is another schematic structural diagram of an under-screen fingerprint identification apparatus according to an embodiment of the present application.

FIG. 24 is a schematic structural diagram of an under-screen fingerprint identification apparatus 700 according to an embodiment of the present application. The under-screen fingerprint identification apparatus 700 shown in FIG. 24 may include a processor 710, the processor 710 may call a computer program from a memory and run it to implement the method in the embodiment of the present application.

Optionally, as shown in FIG. 24, the under-screen fingerprint identification apparatus 700 may further include a memory 720. The memory 720 may be configured to store indication information, and may further be configured to store codes and instructions executed by the processor 710. The processor 710 may call a computer program from the memory 720 and run it to implement the method in the embodiment of the present application.

The memory 720 may be a separate device independent of the processor 710 or may be integrated in the processor 710.

Optionally, as shown in FIG. 24, the under-screen fingerprint identification apparatus 700 may further include a display screen 740 for displaying information to a user.

Optionally, as shown in FIG. 24, the under-screen fingerprint identification apparatus 700 may further include a fingerprint identification module 730, where the fingerprint identification module 730 may be configured to acquire light intensity of capturing blocks, and when the light intensity is greater than a preset condition, the fingerprint identification module 730 acquires fingerprint information of a capturing area so that the processor 710 performs fingerprint identification according to the fingerprint information.

Optionally, the under-screen fingerprint identification apparatus 700 may correspond to the under-screen fingerprint identification apparatus 600 in the embodiment of the present application, and may correspond to a corresponding subject for executing the methods according to the various method embodiments in FIG. 14, FIG. 15, FIG. 20 to FIG. 22 of the present application, which is not repeatedly described here for brevity.

It should be understood that the various components in the under-screen fingerprinting identification apparatus 700 are connected by a bus system, where the bus system includes a power bus, a control bus and a status signal bus in addition to a data bus.

It should be understood that the processor described in the embodiment of the present application may be an integrated circuit chip with signal processing capability, and can implement and execute the methods, the steps, and the logical block diagrams disclosed in the embodiments of the present application.

For example, the foregoing processor may be a general purpose processor, a digital signal processor (DSP), an application specific integrated circuit (ASIC), a field programmable gate array (FPGA) or another programmable logic device, a transistor logic device, a discrete hardware component, or the like. In addition, the general purpose processor may be a microprocessor or the processor may be any conventional processor or the like.

In addition, the memory described in the embodiments of the present application may be a volatile memory or a nonvolatile memory, or may include both volatile and non-volatile memory.

The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and used as an external cache.

It should be understood that the foregoing memory is an example and not limitation. For example, the memory in the embodiment of the present application may further be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM), a direct rambus random access memory (Direct Rambus RAM, DR RAM), and the like.

Figure 25:
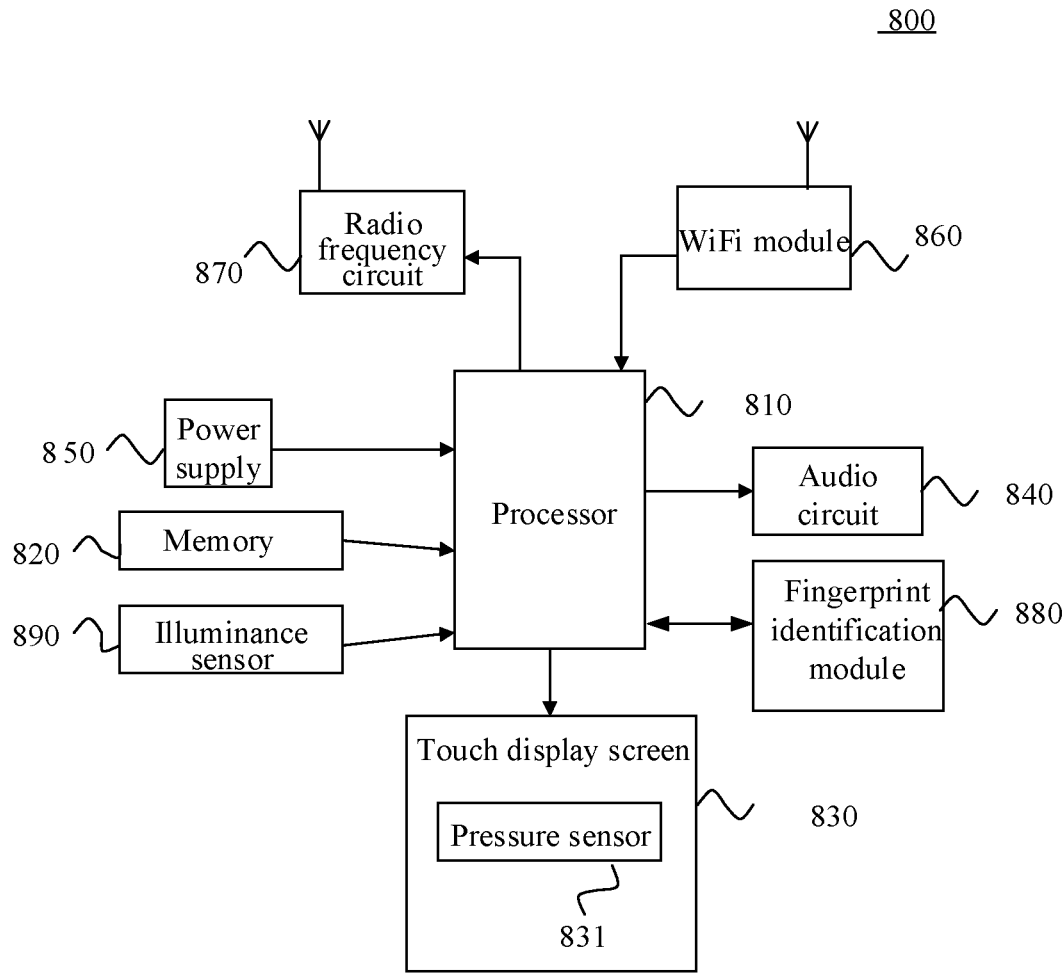
FIG. 25 is a schematic structural diagram of an electronic device according to an embodiment of the present application.

FIG. 25 is a schematic structural diagram of an electronic device (for example, a touch screen cell phone) 800 to which an embodiment of the present application is applied. As shown in FIG. 25, the electronic device 800 may include:

a processor 810, a memory 820 and a touch display screen 830.

The touch display screen 830 includes a pressure sensor 831 for sensing a magnitude of pressure of a touch input signal on the touch display screen 830. The processor 810 is configured to receive a pressure signal sensed by the pressure sensor 831 and to process the pressure signal, for example, trigger a certain application in the mobile terminal 100 based on the pressure signal.

Optionally, as shown in FIG. 25, the electronic device 800 may further include a fingerprint identification module 880, where the fingerprint identification module 880 is configured to acquire light intensity of capturing blocks, and acquire fingerprint information of a capturing area when the light intensity satisfies a preset condition.

Optionally, as shown in FIG. 25, the electronic device 800 may further include an illuminance sensor 890 configured to determine whether the touch display screen 830 is shielded.

Optionally, the electronic device may further include other components, such as an audio circuit 840, a power supply 850, a WiFi module 860, a radio frequency circuit 870 and the like as shown in FIG. 1 It should be understood that the power source 850 may include a visible light source and an infrared light source, where visible light emitted by the visible light source is used to display an image, and infrared light emitted by the infrared light source is used for fingerprint identification.

It should be noted that terms used in embodiments of the present application and the claims appended hereto are merely for the purpose of describing particular embodiments, and are not intended to limit the embodiments of the present application.

For example, the use of a singular form of "a", "said", "the above" and "the" in the embodiments of the present application and the claims appended hereto are also intended to include a plural form, unless otherwise clearly indicated herein by context.

Those skilled in the art may be aware that, units and algorithm steps of the examples described in the embodiments disclosed in this paper may be implemented by electronic hardware, computer software, or a combination of the two. Whether these functions are executed in hardware or software mode depends on a particular application and a design constraint condition of the technical solutions. Persons skilled in the art may use different methods to implement the described functions for every particular application, but it should not be considered that such implementation goes beyond the scope of the embodiments of the present application.

If the integrated unit is implemented in the form of the software functional unit and is sold or used as an independent product, it may be stored in a computer readable storage medium. Based on such understanding, the technical solutions of the embodiments of the present application substantially, or the part of the present disclosure making contribution to the prior art, or a part of the technical solutions may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The storage medium includes: various media that may store program codes, such as a U-disk, a removable hard disk, a read-only memory, a random access memory, a magnetic disk, a compact disk, and so on.

It may be clearly understood by a person skilled in the art that, for the purpose of convenient and brief description, for a detailed working process of the foregoing device, apparatus, and unit, reference may be made to a corresponding process in the foregoing method embodiments, and details are not described herein again.

In the several embodiments provided in the present application, it should be understood that the disclosed electronic device, apparatus and method may be implemented in other manners.

For example, the division of the units or modules or components in the apparatus embodiments described above is only a logic function division, other division modes may be adopted in practice, e.g., multiple units or modules or components may be combined or integrated in another system, or some units or modules or components may be omitted or be not executed.

For another example, the units/modules/components described as separate/display components may be or may not be physically separated, namely, may be located in one place, or may be distributed on a plurality of network units. Part of or all of the units/modules/components here may be selected according to a practical need to achieve the objectives of the embodiments of the present application.

Finally, it should be noted that the above displayed or discussed mutual coupling or direct coupling or communication connection may be indirect coupling or communication connection via some interfaces, apparatuses or units, and may be in electrical, mechanical or other forms.

The above contents are the specific embodiments of the present application only, but the protection scope of the embodiments of present application is not limited thereto, those skilled who are familiar with the art could readily think of variations or substitutions within the technical scope disclosed by the embodiments of the present application, and these variations or substitutions shall fall within the protection scope of the embodiments of the present application. Therefore, the protection scope of the embodiments of the present application should be determined with reference to the protection scope of the claims.

What is claimed is:

1. An under-screen fingerprint identification apparatus, wherein the under-screen fingerprint identification apparatus is applied to an electronic device having a backlight module, and comprises:
   a fingerprint identification module disposed under the backlight module and configured to receive an infrared light signal passing through the backlight module that is emitted by an infrared light source and illuminates a human finger, wherein the infrared light signal is used to detect fingerprint information of the finger;
   wherein a haze of the infrared light signal passing through a diffusion layer of the backlight module is less than a haze of visible light for displaying an image passing through the diffusion layer of the backlight module;
   wherein light transmittance of the infrared light signal passing through the diffusion layer of the backlight module is greater than light transmittance of the visible light passing through the diffusion layer of the backlight module; and
   wherein reflectivity of the infrared light signal passing through a reflection layer of the backlight module is less than reflectivity of the visible light passing through the reflection layer backlight module.

2. The under-screen fingerprint identification apparatus according to claim 1 wherein the under-screen fingerprint identification apparatus further comprises: a visible light filter disposed between the backlight module and the fingerprint identification module.

3. The under-screen fingerprint identification apparatus according to claim 1, wherein the under-screen fingerprint identification apparatus comprises:
   at least one infrared light source, wherein each infrared light source is disposed under a display screen.

4. The under-screen fingerprint identification apparatus according to claim 3, wherein when the under-screen fingerprint identification apparatus comprises a plurality of infrared light sources, the plurality of infrared light sources are symmetrically arranged with the fingerprint identification module as a center, or the plurality of infrared light sources are symmetrically arranged based on an axis of symmetry, and the axis of symmetry is a line that passes through the fingerprint identification module and is parallel to the display screen.

5. The under-screen fingerprint identification apparatus according to claim 3, wherein the infrared light source is flatly attached to a lower surface of the display screen, or the infrared light source is obliquely attached to a lower surface of the display screen.

6. An electronic device comprising:
   an under-screen fingerprint identification apparatus comprising a fingerprint identification module; and
   a backlight module, wherein the fingerprint identification module is disposed under the backlight module and configured to receive an infrared light signal passing through the backlight module that is emitted by an infrared light source and illuminates a human finger, wherein the infrared light signal is used to detect fingerprint information of the finger;
   wherein the backlight module comprises:
   a diffusion layer, wherein a haze of an infrared light signal passing through the diffusion layer is less than a haze of visible light passing through the diffusion layer and light transmittance of an infrared light signal passing through the diffusion layer is greater than light transmittance of visible light passing through the diffusion layer; and wherein the backlight module comprises:

a reflection layer, wherein light transmittance of an infrared light signal passing through the reflection layer is greater than light transmittance of visible light passing through the reflection layer.

7. The electronic device according to claim 6, wherein the backlight module comprises:

a steel plate provided with a hole, wherein the fingerprint identification module is disposed under the hole and configured to receive an infrared light signal passing through the hole that is emitted by an infrared light source and illuminates a human finger.

8. The electronic device according to claim 6, wherein the electronic device further comprises:

a display screen, wherein the under-screen fingerprint identification apparatus is disposed under the display screen.

9. A backlight module for under-screen fingerprint identification, wherein the backlight module is configured to transmit an infrared light signal that is emitted by an infrared light source and illuminates a human finger to a fingerprint identification module, and the infrared light signal is used to detect fingerprint information of the finger;

wherein the backlight module comprises:

a diffusion layer, wherein a haze of the infrared light signal passing through the diffusion layer is less than a haze of the visible light passing through the diffusion layer and light transmittance of the infrared light signal passing through the diffusion layer is greater than light transmittance of the visible light passing through the diffusion layer; and a reflection layer, wherein light transmittance of the infrared light signal passing through the reflection layer is greater than light transmittance of the visible light passing through the reflection layer.

10. The backlight module according to claim 9, wherein the backlight module comprises:

a steel plate provided with a hole, wherein the fingerprint identification module is disposed under the hole and configured to receive the infrared light signal passing through the hole that is emitted by the infrared light source and illuminates the human finger.

11. The backlight module according to claim 9, wherein the backlight module further comprises:

at least one infrared light source, wherein each infrared light source is disposed under a display screen.

12. The backlight module according to claim 11, wherein when the backlight module comprises a plurality of infrared light sources, the plurality of infrared light sources are symmetrically arranged with the fingerprint identification module as a center, or the plurality of infrared light sources are symmetrically arranged based on an axis of symmetry, and the axis of symmetry is a line that passes through the fingerprint identification module and is parallel to the display screen.

* * * * *